(12) United States Patent
Mommileti

(10) Patent No.: US 10,931,545 B2
(45) Date of Patent: Feb. 23, 2021

(54) POLICY-BASED SAMPLING OF NETWORK FLOWS AT A NETWORK VISIBILITY NODE

(71) Applicant: Gigamon Inc., Santa Clara, CA (US)

(72) Inventor: Srinivasa Mommileti, Cupertino, CA (US)

(73) Assignee: Gigamon Inc., Santa Clara, CA (US)

( * ) Notice: Subject to any disclaimer, the term of this patent is extended or adjusted under 35 U.S.C. 154(b) by 598 days.

(21) Appl. No.: 15/826,286

(22) Filed: Nov. 29, 2017

(65) Prior Publication Data

US 2019/0166020 A1    May 30, 2019

(51) Int. Cl.
| | |
|---|---|
| *H04L 12/26* | (2006.01) |
| *H04L 12/721* | (2013.01) |
| *H04L 12/813* | (2013.01) |
| *H04L 29/06* | (2006.01) |
| *H04L 12/801* | (2013.01) |
| *H04L 12/853* | (2013.01) |

(52) U.S. Cl.
CPC .......... *H04L 43/022* (2013.01); *H04L 45/38* (2013.01); *H04L 47/20* (2013.01); *H04L 65/1006* (2013.01); *H04L 65/1016* (2013.01); *H04L 65/605* (2013.01); *H04L 65/80* (2013.01); *H04L 47/19* (2013.01); *H04L 47/2416* (2013.01); *H04L 63/20* (2013.01); *H04L 65/403* (2013.01)

(58) Field of Classification Search
CPC ....... H04L 43/022; H04L 43/12; H04L 45/38; H04L 63/1425; H04L 65/1006; H04L 65/605; H04L 65/1016; H04L 65/80; H04L 47/20; H04L 43/026; H04L 65/403; H04L 47/19; H04L 63/20; H04L 47/2416
See application file for complete search history.

(56) References Cited

U.S. PATENT DOCUMENTS

| | | | | |
|---|---|---|---|---|
| 6,836,466 | B1 * | 12/2004 | Kant ....................... | H04L 29/06 370/232 |
| 7,313,100 | B1 * | 12/2007 | Turner .................. | H04L 43/026 370/244 |
| 8,111,690 | B2 * | 2/2012 | Hussain .................. | H04L 45/00 370/389 |
| 9,853,876 | B1 * | 12/2017 | Ranjan .................... | H04L 43/10 |
| 2013/0029629 | A1 * | 1/2013 | Lindholm ......... | H04W 36/0022 455/404.1 |
| 2014/0254406 | A1 * | 9/2014 | Anumala ................ | H04L 47/10 370/252 |
| 2014/0321278 | A1 * | 10/2014 | Cafarelli ................. | H04L 43/12 370/235 |
| 2015/0139208 | A1 * | 5/2015 | Chan ...................... | H04L 45/00 370/338 |

(Continued)

*Primary Examiner* — Oanh Duong
(74) *Attorney, Agent, or Firm* — Perkins Coie LLP

(57) ABSTRACT

Methods and systems are disclosed for analyzing control signaling messages over a network to inform policy-based sampling of network flows using a network visibility node communicatively coupled to the network. In an illustrative embodiment, session dialog information is extracted from control signaling messages exchanged between subscriber devices initiating a communications session and tracked. A network flow associated with the communications session is selected for sampling at the network visibility node based on the tracked session dialog information. Packets associated with the network flow are then forwarded by the network visibility node to an external tool for processing.

30 Claims, 10 Drawing Sheets

(56) References Cited

U.S. PATENT DOCUMENTS

2016/0094430 A1* 3/2016 Sella .................... H04L 43/026
370/252
2017/0289046 A1* 10/2017 Faccin ................ H04L 47/2433
2018/0367541 A1* 12/2018 Ponnuswamy ......... H04L 63/20

* cited by examiner

POLICY-BASED SAMPLING OF NETWORK FLOWS AT A NETWORK VISIBILITY NODE

TECHNICAL FIELD

The present disclosure generally relates to network traffic visibility technology.

BACKGROUND

With ever-increasing amounts of data traffic on modern computer networks, network monitoring and security measures play an increasingly important role in reducing the vulnerability of a network to intrusion, unauthorized access and other security or performance issues. Tools can be deployed in a computer network that process the network traffic and provide monitoring and security services. Examples of network monitoring tools include an intrusion detection system (IDS), an intrusion prevention system (IPS), a sniffer, a network monitoring system, an application monitoring system, an intrusion detection system, a forensic storage system, and an application security system, among others.

Tools deployed in a network environment are only effective to the extent that they can see the network traffic. Existing approaches to network traffic visibility involve deploying multiple instances of the same tool across a computer network to increase visibility into the network traffic. Alternatively, one or more network visibility nodes can be communicatively coupled between communicating nodes on a computer network. In an in-line deployment, packets originating from a source node on a computer network are routed by the visibility node through a tool before continuing on to the intended destination node. In contrast, in an out-of-band deployment, copies of packets originating from one node are made by the visibility node and routed to the tool, while the original packets are forwarded by the visibility node on the network for transmission to the intended receiving node.

Various techniques may be used in network visibility techniques, including load balancing, filtering and sampling. Sampling techniques may include technologies such as NetFlow, sFlow, cFlow, etc. These flow based sampling techniques may randomly sample one packet out of every N packets. For certain applications of network visibility processing, this one packet out of every N packets sampling technique is sufficient to infer network monitoring and security performance. However, for certain types of network and security monitoring, sampling one packet out of every N packets may not be sufficient for that purpose, because certain analysis techniques may provide inaccurate data results if all of the packets for a given set of user data sessions (network flows) are not available for analysis.

BRIEF DESCRIPTION OF THE DRAWINGS

The present disclosure is illustrated by way of example, and not by way of limitation, in the figures of the accompanying drawings and in which like reference numerals refer to similar elements. The figures of the accompanying drawings depict only example embodiments of the present disclosure and are therefore not to be construed as limiting. In the drawings.

DETAILED DESCRIPTION

Overview

A service provider looking to analyze traffic over a given network may wish to sample network flows associated with communications between subscribers based on one or more network flow parameters such as selected codecs and/or quality of service requirements for the codecs. In order to do so, a service provide may set policies for sampling network flows based on such parameters. However, network flows associated with communications between subscribers typically involve both a control session and one or more associated media sessions. Each of these sessions may include multiple packets containing varying information and arriving from different nodes on the network. This presents challenges both when identifying network flows for sampling as well as associating received packets with a given network flow.

Introduced herein is a technique that addresses these challenges by performing an analysis of control signaling messages in control sessions to inform policy-based sampling of network flows using a network visibility node communicatively coupled to a network. In certain network contexts, control signaling messages may include information that is indicative of a parameter of a given network flow. Control signaling messages may include, for example, messages of offer, answer, codec selection, Quality of Service (QoS) requirements for codecs, session progress, context activation, etc. By analyzing a dialog exchange represented in the control signaling messages, a network visibility node may determine one or more parameters of an associated network flow that may include one or more associated media sessions. If the determined one or more parameters satisfy a sampling criterion (e.g., based on a policy set by a service provider), any packets associated with the network (including control and media packets) are then forwarded by the network visibility node to external tools (e.g., network monitoring tools) for processing.

Figure 1:
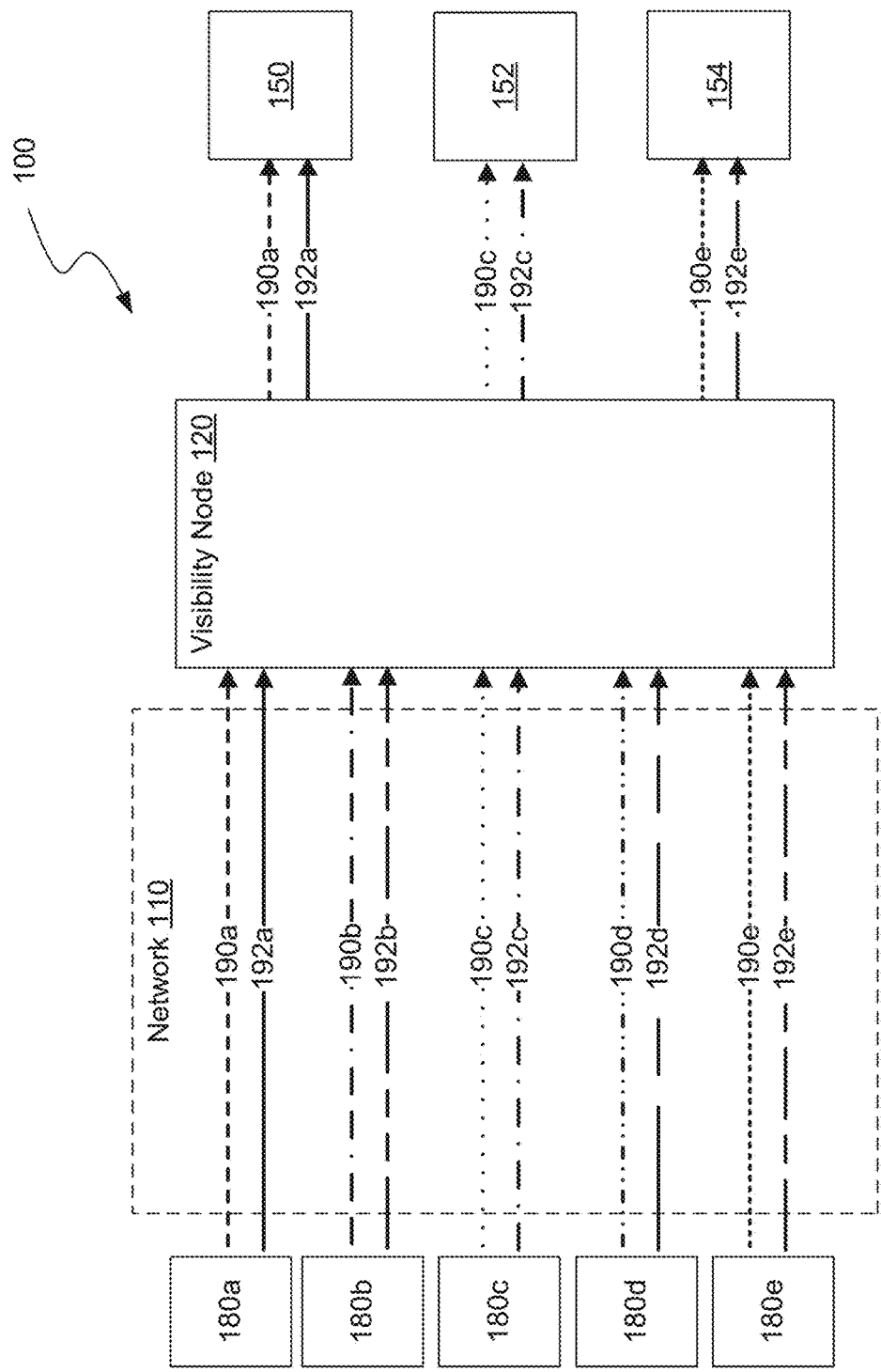
FIG. 1 shows a diagram of an example system including a network visibility node communicatively coupled to a computer network.

FIG. 1 shows an example system 100 including a network visibility node 120 communicatively coupled to a computer network 110. The network visibility node 120 is described in more detail with respect to FIGS. 2A-2C. The network visibility node 120 may be one of multiple network visibility nodes deployed as part of a visibility fabric. A visibility fabric may include one or more physical and/or virtual devices that tap into a given network (e.g., network 110) to receive traffic and forward, pass, or otherwise transmit the traffic to various tools for processing. For example, the network visibility node 120 depicted in FIG. 1 can route traffic communicated over a network such as network 110 to the one or more centralized in-line and/or out-of-band tools 150, 152, and 154 for processing.

As previously mentioned, in certain contexts, traffic over a network may include control plane traffic and corresponding data plane traffic (e.g., associated with one or more media sessions). For example, a network 110 may be configured to enable real-time communication between subscriber devices (e.g., including voice, video, messaging, etc.). To facilitate such real-time communication, a control protocol may be implemented to handle the initiating, maintaining, modifying, and/or terminating real-time communications sessions involving one or more media streams. In an example embodiment, a network 110 may be configured as or include an IP Multimedia Subsystem (IMS) network that utilizes the Session Initiation Protocol (SIP) to control one or more Real-time Transport Protocol (RTP) media streams. For example, as depicted in FIG. 1, a set of subscribers 180a-e communicating over network 110 each may be associated with control traffic 190a-e (e.g., based on SIP) and corresponding media traffic 192a-e (e.g., based on RTP) (respectively).

As will be described, the network visibility node 120 can be configured to sample packets from certain network flows to then forward the packets to the one or more external tools 150, 152, 154 for processing. Visibility into a given subscriber's activity over the network 110 may depend on the effective processing of both the control traffic and media traffic associated with a communications session involving the given subscriber. In other words, a sampled network flow should include all (i.e., 100%) of both the control packets associated with a control session and media packets associated with one or more corresponding media sessions. For example, the scenario depicted in FIG. 1 shows the sampling of network flows including control packets 190a, 190c, 190e and media packets 192a, 192c, 192e that are associated with subscribers 180a, 180c, and 180e (respectively).

Notably, the scenario depicted in FIG. 1 shows the sampling, at network visibility node 120, of only a subset of the received network flows (i.e., those associated with subscribers 180a, 180c, and 180e). As previously mentioned, such selective sampling may be according to a policy-based sampling criteria based on certain network flow parameters such as selected codecs and quality of service (QoS) requirements.

Example Network Visibility Node

Figure 2A:
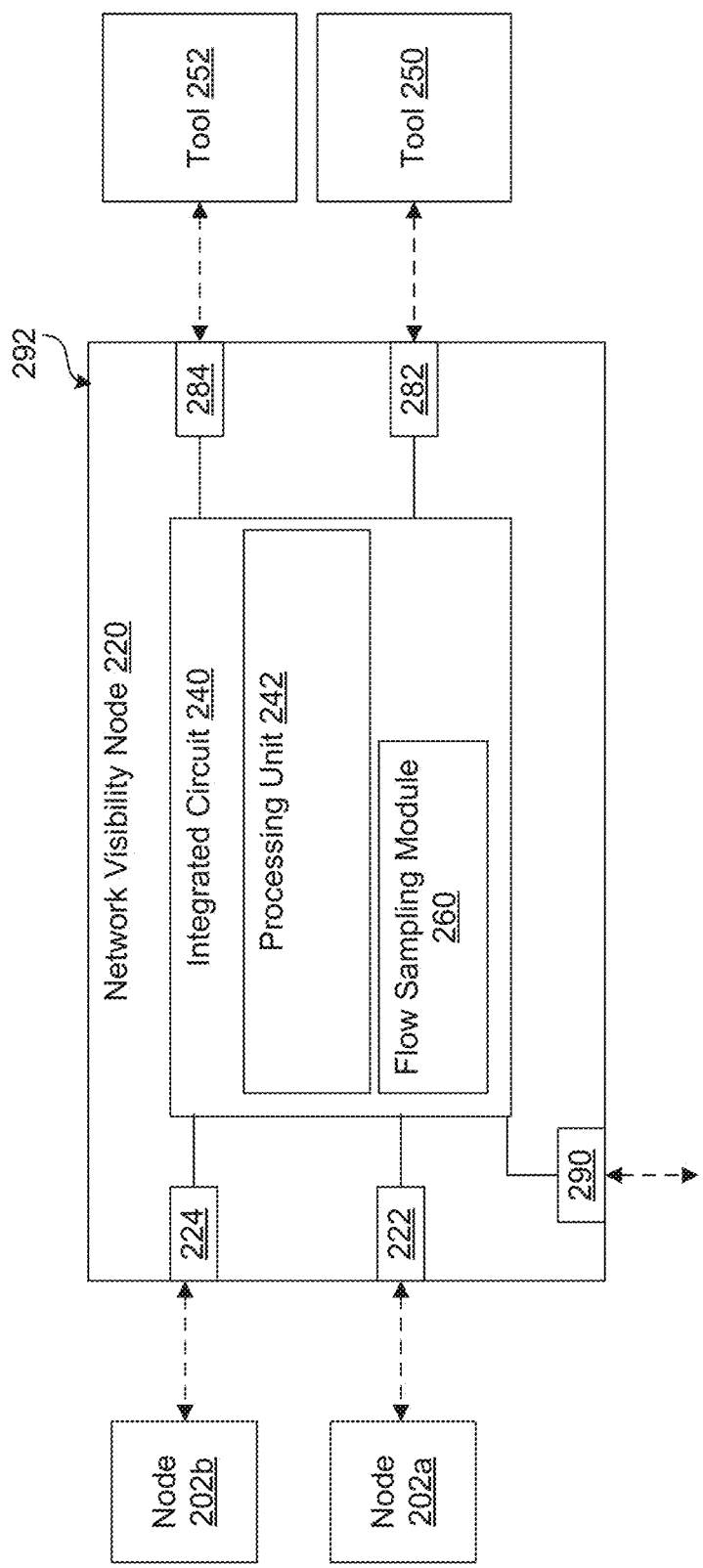
FIG. 2A shows a diagram of an example network visibility node.

FIG. 2A shows an example network visibility node 220. The example network visibility node 220 may be the same as or similar to the network visibility node 120 depicted in FIG. 1. It will be appreciated that the network visibility node 220 depicted in FIG. 2A is an example provided for illustrative purposes. The example network visibility node 220 includes a housing 292, one or more network ports 222, 224, and one or more tool ports 282, 284. As used herein, the term "network port" may refer to any port of the network visibility node 220 configured to be communicatively coupled to a network (e.g., network 110). The term "tool port" may refer to any port of the network visibility node 220 that is configured to communicatively couple to an external tool (e.g., tool 250, 252), i.e., a tool that is external to the visibility node 220.

The network visibility node 220 also includes one or more integrated circuits 240, which in some embodiments may include one or more processing units 242. Note the network visibility node 220 with a housing 292 is depicted in FIG. 2A as a physical device. However, in other embodiments, a network visibility node with similar functionality to network visibility node 220 may be implemented at least partially in software (i.e., virtualized) within a physical device or distributed across multiple physical devices.

The network visibility node 220 also includes a flow sampling module 260, which along with processing unit(s) 242 may perform one or more of the operations described herein. The flow sampling module 260 is depicted as separate from the processing unit 242, but may, in some embodiments, be integrated. Further, the processing unit 242 and flow sampling module 260 are depicted in FIG. 2A as part of the integrated circuit 240, but may in some embodiments comprise separate components. For example, the flow sampling module 260 may include a set of instructions stored in a memory unit (not shown) that is communicatively coupled to the integrated circuit 240. In the illustrated embodiment, the network visibility node 220 may also include other components, such as a physical layer network chip ("Network PHY") (not shown) coupled to each of the respective ports 222, 224 and 282, 284, wherein the Network PHYs may be considered to be parts of the integrated circuit 240. Alternatively, the Network PHYs may be considered to be components that are separate from the integrated circuit 240. The PHY is configured to connect a link layer device to a physical medium such as an optical fiber, copper cable, etc. In other embodiments, instead of the PHY, the network visibility node 220 may include an optical transceiver, or a serializer/deserializer (SERDES), etc. The housing 292 allows the network visibility node 220 to be carried, transported, sold, and/or operated as a single unit. The ports 222, 224 and 282, 284 are located at a periphery of the housing 292. In other embodiments, the ports 222, 224 and 282, 284 may be located at other locations relative to the housing 292. Although two network ports 222 and 224 are shown, in other embodiments, the network visibility node 220 may include fewer or more than two network ports. Also, although two tool ports 282 and 284 are shown, in other embodiments, the network visibility node 220 may include fewer or more than two tool ports. The tool ports 282, 284 may be configured to communicate with one or more tools 250, 252, for example for network monitoring. In FIG. 2A, each tool 250, 252 is depicted as being coupled to the network visibility node 220 via a single tool port 282, 284 (respectively). This is done for illustrative clarity and is not to be construed as limiting. For example, each tool port 282, 284 depicted in FIG. 2A may actually represent multiple physical or virtual tool ports. For example, in some embodiments tool port 282 includes a first tool port for transmitting packets to tool 250 and a second tool port for receiving packets from tool 250 after processing. Tools 250, 252 may be the same or similar to tools 150, 152, 154 described with respect to FIG. 1. The one or more tools 250, 252 may include one or more network tools. In other cases, the one or more tools 250, 252 may be one or more non-transitory media, such as one or more storage devices, one or more databases, etc. In some embodiments, the one or more tools 250, 252 may represent physical and/or virtual devices.

In an embodiment, during use, a first network port 222 of the network visibility node 220 is communicatively coupled (e.g., via a network 110) to a first node 202a, and a second network port 224 is communicatively coupled (e.g., via the network 110) to a second node 202b. The term "node" in this context may refer to any entity (e.g., a device, application, user, etc.) communicating over the network. Communication may be over a combination of private and public networks (e.g., the Internet). In some embodiments, the network visibility node 220 is configured to receive packets from nodes 202a-b via the network ports 222, 224. Packets received from nodes 202a-b can be processed according to the techniques described herein at the processing unit 242 of network visibility node 220 and/or forwarded on to one or more external tools 250, 252 via the tool ports 282, 284 for processing. In an in-line configuration, the received packets are then forwarded to the destination node (e.g., node 202a or 202b) after processing (e.g., at network visibility node 220 and/or the one or more external tools 250, 252).

As previously described, tool ports 282, 284 of the network visibility node 220 may be communicatively coupled to the respective tools 250, 252. The tools 250, 252 may be directly coupled to the network visibility node 220 or communicatively coupled to the network visibility node 220 through a network (e.g., network 110). In some cases, the network visibility node 220 is provided as a single unit that allows the network visibility node 220 to be deployed at a single point along a communication path. In the illustrated embodiments, the network visibility node 220 (e.g., the integrated circuit 240) is configured to receive packets from nodes 202a-b via the network ports 222, 224 and process the packets in accordance with a predefined scheme.

In some embodiments, one or more of the network ports 222, 224 may be configured to receive normal packets (e.g., packets not from a virtualized network), as well as virtualized packets (e.g., packets with tunnel format that includes an encapsulation of the original packets resulting from virtualization technology). In other embodiments, one or more of the network ports 222, 224 may be configured to receive only non-virtualized packets. In further embodiments, one or more of the network ports 222, 224 may be configured to receive only virtualized packets.

The integrated circuit 240 may be or include any switch module that provides packet transmission in accordance with a particular transmission scheme. The integrated circuit 240 may be user-configurable such that packets may be transmitted in a one-to-one configuration (i.e., from one network port to a tool port). A tool (e.g., tools 250, 252) may be, or may be part of, a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, or a database. The tool may also be or be part of a pass-through device (i.e., it can receive packets, and transmit the packets back to the network visibility node 220 after the packets have been processed), such as an intrusion prevention system. In other embodiments, the integrated circuit 240 may be configured such that the packets may be transmitted in a one-to-many configuration (i.e., from one network port to multiple tool ports). In other embodiments, the integrated circuit 240 may be configured such that the packets may be transmitted in a many-to-many configuration (i.e., from multiple network ports to multiple tool ports). In further embodiments, the integrated circuit 240 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the network visibility node 220 so that the packets (or certain types of packets) are routed according to any one of these configurations.

Tool ports can be logically grouped into load balanced tool port groups that include two or more tool ports. For example, in a one-to-one configuration, a packet received at a particular network port may be forwarded to one of the tool ports (e.g., the least utilized tool port) in a particular load balanced tool port group.

In some embodiments, the packet movement configuration is predetermined such that when the network visibility node 220 receives the packets, the network visibility node 220 will automatically forward the packets to the tool ports based on the predetermined packet movement configuration (e.g., one-to-one, one-to-many, many-to-many, and many-to-one) without the need to analyze the packets (e.g., without the need to examine the header, determine the type of packets, etc.).

In accordance with some embodiments, the integrated circuit 240 may have the functionalities of a conventional packet switch except that it provides visibility into various parts of a network. Thus, embodiments of the integrated circuit 240 may operate like a conventional managed packet switch, but provide packet monitoring functionality. This is accomplished by configuring the integrated circuit 240 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the integrated circuit 240 may be an "out-of-band" network switch, which is configured to obtain packets and pass them to a tool or to a network that is different from that associated with the original intended destination of the packets.

Also, the term "out-of-band" device/switch refers to a device that is not involved in a transmission of a packet from a first node to an intended recipient node. In some cases, a device may be both an in-line device and an out-of-band device with respect to processing different packets. For example, the network visibility node 220 may be an in-line device if it receives a packet (intended for transmission from node 1 to node 2) from a network, and passes the packet back to the network (e.g., after the packet has been processed by a pass-through network tool) for transmission downstream to the node 2. The same network visibility node 220 may also be an out-of-band device if it receives another packet from the network, and does not pass the packet back to the network for transmission to the intended receiving node.

It should be noted that the integrated circuit 240 that may be used with the network visibility node 220 is not limited to the examples described above, and that other integrated circuits 240 with different configurations may be used as well. Also, in one or more embodiments described herein, the integrated circuit 240 may be implemented using a processor (e.g., a general purpose processor, a network processor, an application-specific integrated circuit (ASIC) processor, a field-programmable gate array (FPGA) processor, etc.).

In other embodiments, the network visibility node 220 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 242 or the integrated circuit 240 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the integrated circuit 240. The integrated circuit 240 then forwards the packet to one or more of the tool ports 282, 284 according to a pre-determined or user-defined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. The additional processing unit may be located outside the housing of the network visibility node 220 or may be a part of the integrated circuit 240. For example, the additional processing unit may be considered to be a part of the processing unit 242. Also, in some embodiments, the additional processing unit may be a general purpose processor, a network processor, an ASIC processor, a FPGA processor, or any other types of processor. In other embodiments, the additional processing unit may be any hardware, software, or combination thereof.

In the illustrated embodiments, the processing unit 242 is illustrated as a component of the integrated circuit 240. In some cases, the processing unit 242 may be one or more processors in the integrated circuit 240. In other cases, the processing unit 242 may be one or more circuit components that are parts of the integrated circuit 240. In other embodiments, the processing unit 242 may be a separate component from the integrated circuit 240. The processing unit 242 may be implemented using a processor, such as a general processor, a network processor, an ASIC processor, a FPGA processor, etc. In other embodiments, the processing unit 242 may be a field processor. In further embodiments, the processing unit 242 may be a network card. The processing unit 242 may be implemented using one or more processors, wherein one or more of the processors may be considered to be a part of the network visibility node 220 or not. Also, in some embodiments, the integrated circuit 240 may include ternary content-addressable memory (TCAM). The integrated circuit 240 may be configured to perform various packet processing functions, included but not limited to packet filtering, packet routing, packet switching, packet mirroring, packet aggregation, etc.

As shown in the figure, the network visibility node 220 further includes one or more I/O port(s) 290 for importing and exporting data. For example, in an embodiment, port 290 may include a configuration port for receiving configuration information to thereby configure any of integrated circuit 240, processing unit 242, or flow sampling module 260. For example, in an embodiment, data is received at port 290 for configuring a switching fabric associated with integrated circuit 240, processing unit 242, and/or flow sampling module 260 according to a user-configured transmission scheme and/or flow sampling policy.

In some embodiments, I/O port(s) 290 may be a separate and different port from the other network ports 222, 224 and tool ports 282, 284. In other embodiments, the port 290 may be a network port, like the network ports 222, 224 or may be implemented using one or both of the network ports. In such cases, in addition to receiving configuration information and exporting generated outputs, the port 290 may also receive network traffic that is being communicated between nodes (e.g., nodes 202a-b). Also, in further embodiments, the network visibility node 220 may include multiple I/O ports 290 for transmitting and receiving information.

Figure 2B:
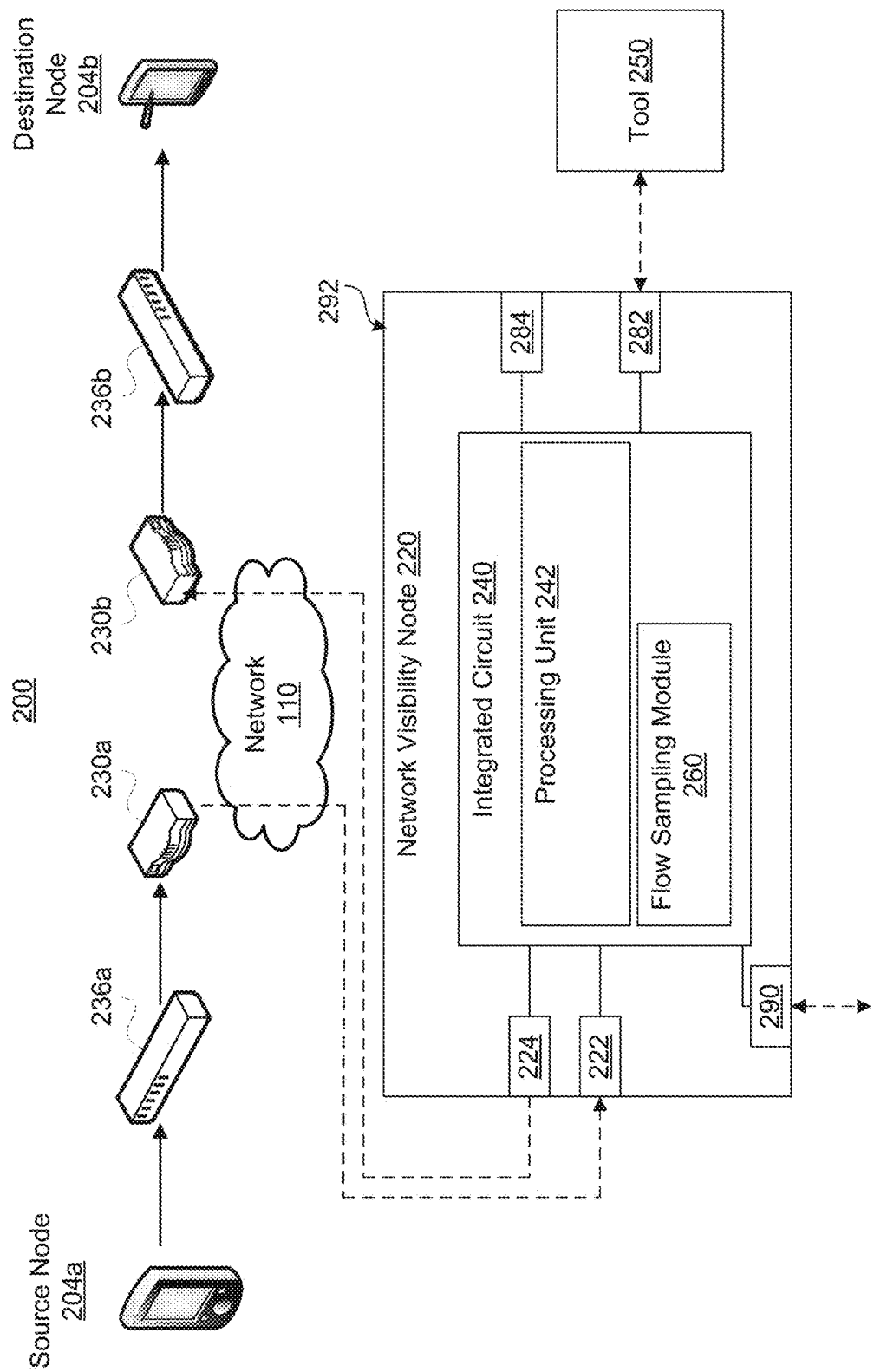
FIG. 2B shows a diagram of an example in-line configuration of the network visibility node of FIG. 2A.

The network visibility node 220 can be configured to enable visibility into the traffic transmitted across a network (e.g., network 110). Visibility can be enabled by "tapping" network traffic to and from nodes communicating over the network. In other words, the network visibility node 220 can be configured to tap packets being transmitted from a source node to a destination node over the network. For example, FIG. 2B, shows an example in-line configuration of a network visibility node 220 (e.g., similar to that described with respect to FIG. 2A) illustrating an example route of a packet transmitted over a network (e.g., network 110) from a source node 204a (e.g., a first computing device) to a destination node 204b (e.g., a second computing device). Along the example route, a packet may pass through (i.e., be routed, forwarded, etc.) multiple other nodes (e.g., switches 236a-b and routers 230a-b). In the example route depicted in FIG. 2B, both the network visibility node 220 and the tool 250 are deployed in-line with the packet route (i.e., within the flow of network traffic). For example, the packet originates at source node 204a and is destined for destination node 204b. In the example of FIG. 2B, the packet is tapped at or at some point after router 230a and received at network port 222 of the network visibility node.

The term "tapping" in this context may generally refer to the routing or copying of packets (that are intended for delivery to a destination node 204b) to a network visibility node 220. In an out-of-band configuration, this may include copying the packet along its transmission route and transmitting the copied packet to network visibility node 220 without otherwise impacting the "original" packet's route over network 110. In an in-line configuration (as illustrated) this may include re-directing the packet to the network visibility node 220 before returning the packet to the network 110 for transmission to the designated destination node 204b. In either case, the means for tapping the network traffic can include, for example, a physical or virtual tap device that is communicatively coupled to the network (e.g., network 110) and is configured to copy and/or redirect packet traffic. In some cases, a node (e.g., switch 236a or router 230a) may include port mirroring capabilities. For example any of nodes 236a-b, or routers 230a-b may include a SPAN (switch port analyzer) port configured to copy packets seen on a particular port (or an entire VLAN) via a SPAN port, where the packet can be analyzed.

After reception at network port 222, the packet may be processed at processing unit 242 (e.g., in conjunction with the flow sampling module 260) and/or forwarded to an external tool 250 via a tool port 282. If the packet is forwarded to the tool port 282 (e.g., according to a user-configurable transmission scheme implemented by the switching fabric of integrated circuit 240), the packet continues to tool 250 for processing. After processing, the packet returns to the network visibility node (e.g., via tool port 282 or another tool port) where it is then forwarded to network port 224 (e.g., according to a user-configurable transmission scheme implemented by the switching fabric of integrated circuit 240) where it is then transmitted to the destination node 204b (e.g., via nodes 230b and 236b). If, after receipt at network port 222 and processing at unit 242, the packet is not forwarded to an external tool, the packet may be directly forwarded to network port 224 (e.g., according to a user-configurable transmission scheme implemented by the switching fabric of integrated circuit 240) where it is then transmitted to the destination node 204b (e.g. via nodes 230b and 236b).

Figure 2C:
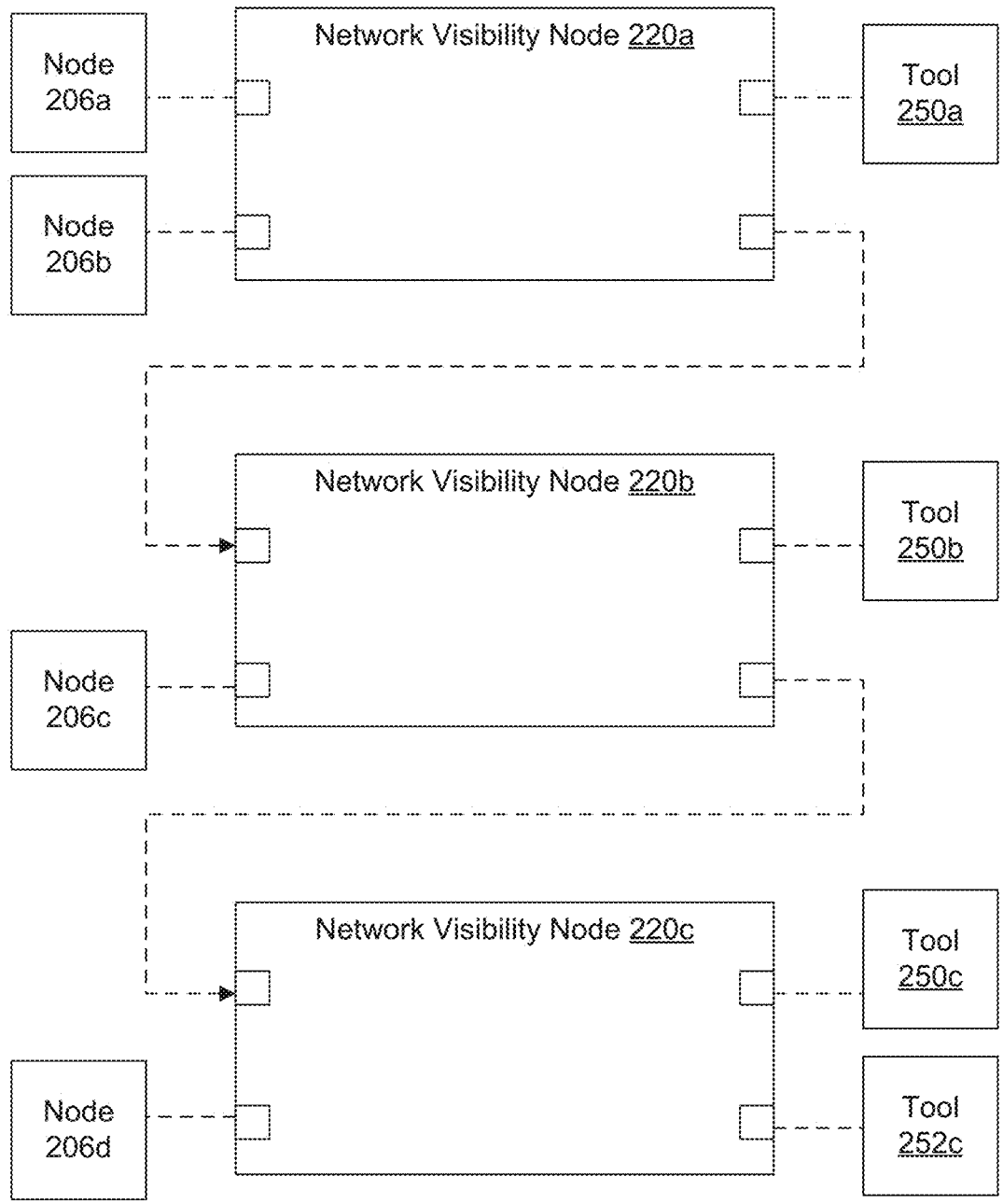
FIG. 2C shows a diagram of an example arrangement of multiple stacked network visibility nodes.

In some embodiments, the technique described herein may be performed by a plurality of network visibility nodes 220 that are stacked together. Also, in some embodiments, any of the above features that are described as being performed by a single network visibility node 220 may alternatively be performed by a single network visibility nodes 220 that are stacked together. Similarly, in some embodiments, any of the above features that are described as being performed by the processing unit 242 may alternatively be performed by a plurality of processing units 242 at the respective network visibility nodes 220 that are stacked together. FIG. 2C illustrates an example of a stacked configuration in which multiple network visibility nodes 220a-c are stacked together. In the example configuration depicted in FIG. 2C, a first network visibility node 220a is communicatively coupled to a tool 250a, and nodes 206a and 206b. The first network visibility node 220a is also communicatively coupled to a second network visibility node 220b. The second network visibility node 220b is communicatively coupled to tool 250b and node 206c, and to a third network visibility node 220c. The third network visibility node 220c is communicatively coupled to tools 250c, 252c and to node 206d. The stacked configuration depicted in FIG. 2C is only an example provided to illustrate that multiple visibility node entities (physical and/or virtual) can be communicatively coupled to each other to provide visibility into a given network. In some embodiments, the system of multiple network visibility nodes 220a-c depicted in FIG. 2C may be collectively considered components in a singular network visibility node or may be collectively considered a visibility fabric comprising multiple network visibility nodes.

For illustrative clarity certain processes associated with the disclosed technique shall be described herein as being performed by the network visibility node 220. Similarly, the network visibility node 220 may be described as being configured to perform the described processes. This shall not be construed as limiting. In some embodiments, certain described processes or individual steps of described processes may be specifically performed by any one or more of the aforementioned subcomponents of the example network visibility node 220. For example, in some embodiments, the described processes or individual steps of described processes may be performed by the integrated circuit 240, the processing unit 242, the flow sampling module 260, or any combination thereof. Further, in some embodiments, the described processes or individual steps of described processes may be performed by another processing unit associated with or in communication with the network visibility node 220.

Overview on Network Flow Sampling

Figure 3:
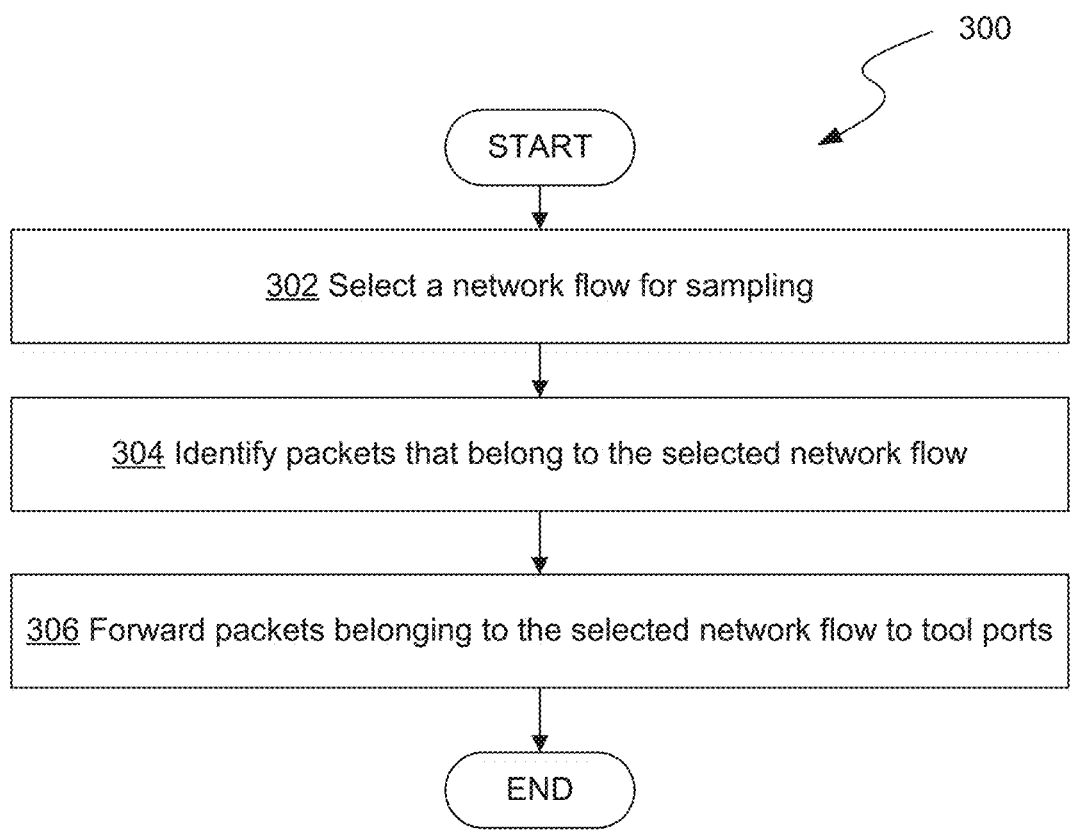
FIG. 3 shows a flow diagram of an example process for sampling packets that belong to a particular network flow.

FIG. 3 shows a flow diagram that describes an example process 300 for sampling packets associated with a certain network flow. Example process 300 begins at step 302 with selecting, by the network visibility node 220, a network flow from a plurality of network flows for sampling. For example, as will be described, the network visibility node 220 may be configured to sample a network flow based on certain parameters of the network flow (e.g., codec selection, QoS requirements, etc.) according to one or more policy-based sampling criteria. Alternatively, or in addition, the network visibility node 220 may be configured to randomly select 1 network flow out of every N network flow that goes through the network visibility node 220. In other embodiments, the selection of the network flow for sampling may be performed using a round robin technique. In further embodiments, a hash computation may be performed on one or more attributes (e.g., Call-ID, from tag, to tag, source IP address, destination address, etc.) of the packets, and the hash value may be used to select certain network flows for processing. In still further embodiments, the network visibility node 220 may be configured to perform control plane processing, and to correlate certain attributes that identify a user (e.g., a subscriber) for a certain flow.

Once a certain network flow has been selected for sampling, the network visibility node 220 identifies all packets that belong to the selected network flow at step 304, and forwards all such packets to one or more tool port(s) 282, 284 of the network visibility node 220 at step 306. As previously discussed, each of the one or more tool ports 282, 284 of the network visibility node 220 may be communicatively coupled to one or more external tools 250, 252. The external tools 250, 252, then receive the forwarded packets belonging to the selected network flow for processing. In other words, the flow chart of FIG. 3 describes an example process by which the network visibility node 220 keeps track of a selected network flow and forwards packets belonging to the selected network flow to an external tool so that the selected network flow can be processed, for example, for analysis, monitoring, etc.

Various techniques may be employed by the network visibility node 220 to select and/or identify certain network flows for sampling. For example, in some embodiments, the network visibility node 220 may be configured to select and/or identify certain network flows based on identifiers included in the received packets such as a Call-ID, from tag, to tag, box-id, card-id, source IP address, destination IP address, uniform resource identifier (URI), or combination of the foregoing. For example, the network visibility node 220 may determine a particular identifier as a flow selection criterion. The network visibility node 220 then uses that information to determine if a network flow including that packet is to be sampled or not. For example, the network visibility node 220 may use a random/hash/round robin selection and choose packets with certain combinations of identifiers to sample or not. The network visibility node 220 may then extract that attribute from each subsequent packet and determine if the subsequent packet is a member of a flow being sampled or not.

Also, in some embodiments, the network visibility node 220 may use an IP address from one or more ranges of IP addresses as a network flow selection criterion. For example, a user station may be assigned an IP address from a range or known ranges of IP addresses. The network visibility node 220 examines both IP addresses (source IP address and destination IP address) and determines if one of them is within one of the predefined ranges. For example, the network visibility node 220 may be configured to look at IP address ranges (X1 through X2, X3 through X4, etc.), and may compare each of the two IP addresses in the packet to each of the ranges. If one of the IP addresses is in the range, then the network visibility node 220 may determine that the packet has a network flow identifier that is a part of the population of flows, and therefore, the packet is a part of the "population" to be sampled. In one implementation, the network visibility node 220 determines which address (the source IP address or the destination IP address) represents a user so that once a potential user is found in the packet, it can be compared against a table containing all the users, and determines if the user in this packet is one to be sampled or not. The network visibility node 220 may employ an algorithm that caches all items in a table representing the population. The network visibility node 220 then selects 1 out of N to be sampled. The above technique allows the network visibility node 220 to sample all of the packets for a given user from a population of many users.

In other embodiments, a sampling criteria may be based on a tuple of various identifiers. For example, the sampling criteria may be based on a 5-tuple (e.g., IP protocol, source IP address, destination IP address, source port, and destination port). In some cases, the 5-tuple may include attributes from an IP packet with TCP/UDP protocol. In such cases, the source port and the destination port may be a UDP/TCP source port and a UDP/TCP destination port, respectively. In some embodiments, network visibility node 220 determines a 5-tuple as a flow selection criterion based attributes extracted from a received packer. The network visibility node 220 may use the attribute information extracted from a received packet to determine if the packet belongs to that network flow in order to determine if the network flow including that packet is to be sampled or not. The network visibility node 220 may then extract that attribute (the 5-tuple) from each subsequent packet and determine if the subsequent packet is a member of a flow being sampled or not. In one implementation, a hash value may be determined using the 5-tuple, and the network visibility node 220 may calculate a hash value for each subsequent packet to determine if the subsequent packet belongs to a flow being sampled or not.

In some embodiments, a network flow may involve a control plane protocol. A control plane protocol may have certain user identifiable attributes and data plane identifiable attributes. In some embodiments, the network visibility node 220 is configured to use the user identifiable attributes to determine which control/data plane packets define the population of the sample of network flows. The data plane protocol does not contain any user identifiable attributes. However, the association/correlation performed by network visibility node 220 allows the network visibility node 220 to choose the appropriate packets in the data plane which are included in the sample, and also choose those appropriate packets which are not in the sample.

Stateful Sampling of Network Flows Involving Corresponding Control and Media Sessions A network flow may involve control traffic based on a control protocol. For example, SIP is a control protocol used in various internet-based telephony applications that include video, voice, messaging, and other real-time applications. Specifically, SIP is a signaling protocol based on an offer/answer model for initiating, maintaining, modifying, and/or terminating such real-time communications sessions. For example, SIP can define signaling messages for generating an offer, generating an answer, status confirmation, updates, refusing an offer, etc. SIP signaling messages can include information identifying entities involved in a real-time communications session such as an imitating subscriber (i.e., calling user) a receiving subscriber (e.g., called user), endpoints (e.g., subscriber devices such as mobile phones) that will send and receive the media steams used to carry voice, video, messages, etc. as part of the communications sessions, and information regarding such media steams. Information included in SIP signaling messages can be arranged according to the Session Description Protocol (SDP). As the name implies, SDP is a protocol for describing a communications session and can include information such as codec information, quality of service (QoS) information, encryption information, timing information, subscriber information, etc. In some embodiments, the media streams are based on RTP. In a given real-time communications session, a control session (e.g., an SIP session) may be associated with one or more media sessions (e.g., RTP sessions). Further, identifying information such as IP addresses of the devices that send/receive packets and participate in the control portion of a communications session may be different than the identifying information of the devices that send/receive packets as part of the media portion of the communications session.

When sampling a network flow comprising a communications session or "call" between subscribers, all of the control packets (e.g., SIP session packets) and media packets (e.g., RTP session packets) should be sampled as part of a network flow in order to represent 100% of the traffic for the communications session. In other words, in this context, a network flow is understood to be associated with a communications session such as a voice call between subscribers. Accordingly, the network flow includes both a control session and one or more media sessions. The control session involves the transmission and/or receipt of control packets (i.e. control plane packets) including control signaling messages (e.g., based on SIP and SDP). Similarly, the one or more media sessions associated with the control session each involve the transmission and/or receipt of a stream (e.g., an RTP stream) of media packets (i.e., data plane packets) representing the content of the communications session.

In some embodiments, the network visibility node 220 may use one or more parameters of a network flow gathered from an analysis of control signaling messages associated with the network flow as a sampling criterion. Various flow sampling criteria may be stored (e.g., in a non-transitory medium associated with the network visibility node 220) so that packets (control and media) to compare against network flow packets are received at the network visibility node 220. In some embodiments, a sampling criterion can be broken down in to a sampling criterion for a control path and a sampling criterion for a media path such that both control packets and media packets of a given network flow are selected for forwarding to one or more external tools for processing. It should be noted that the SIP and RTP are example control and media protocols, and therefore other control protocols and media protocols may be associated in a similar manner in other embodiments.

To facilitate stateful sampling of a network flow including control sessions and media sessions, a network visibility node 220 may be configured to correlate received control packets and media packets to a given network flow. In an embodiment, a correlation engine (e.g., part of the processing unit 242 or specifically the sampling module 260) creates a listing of one or more control sessions and media sessions, for example, based on headers in received control packets. In some embodiments, headers are SIP headers from control packets including signaling messages such as offers, answers, status confirmation, refusals of offers, etc. The listings of information regarding control and media sessions may be stored (e.g., in a non-transitory medium associated with the network visibility node 220) as one or more tables including information gathered from the received packets. Specifically, a correlation engine may create hash tables such as a control session hash table and a media session hash table that map keys to certain hash values based on attributes of received packets. In an embodiment, a hash value for a given control session is generated from an SIP request/response message, for example, based on extracted identifiers such as a Call-ID, from tag, to tag, box-id, card-id, etc. Similarly, hash value for a given media session may be generated based on extracted identifiers from an RTP packet header such as source IP address (and port), destination IP address (and port), box-id, card-id, a synchronization source (SSRC) identifier, etc.

By processing a received packet based on the control and media session hash tables, the correlation engine of the network visibility node can determine that the received packet belongs to a particular control session or media session. To determine if the received packet belongs to a network flow to be sampled, the correlation engine must still identify a network flow that corresponds to the control session or media session of the packet. Recall that a given control session (e.g., an SIP session) may control transfer of media packets in one or more media sessions (e.g., RTP sessions). In some embodiments, certain attributes in the packet traffic for a given control session can be utilized to correlate a corresponding one or more media sessions. In some embodiments, a subscriber identifier such as an SIP Uniform Resource Identifier (URI) may be utilized to correlate certain traffic. Alternatively, or in addition, the correlation engine may correlate control sessions to media sessions based on other attributes such as indicators of codec selection and/or QoS requirements.

In some embodiments, the network visibility node 220 may be configured to periodically back up session information (e.g., any one or more of the maintained session tables) in order to perform stateful session recovery in the event of interruption (e.g., due to failure or reboot) of any of the components of network visibility node 220. Further, stateful session recovery can provide session persistence across multiple session correlation applications. In some embodiments, the network visibility node 220 is configured to perform backup of session information (e.g., session tables) at regular or irregular intervals (e.g., every 10 minutes) or in response to detected events. The backup schedule can be configurable to meet user requirements. In some embodiments, session information for sessions that occur within a window of period (e.g., 5 minutes) may be stored in a non-transitory medium associated with the network visibility node 220. Such a window period may be a "moving" period in the sense that the last 5 minutes of the session information, at any given time, will be stored. This way, every time the network visibility node 220 is rebooted, the session information for the sessions occur within the last 5 minutes before the reboot can be retrieved. In some embodiments, the session information may be automatically retrieved to restore session tracking in response to an event such as a failure or reboot of a component at the network visibility node.

To enable session persistence in a distributed visibility fabric, a network visibility node 220 may be configured to transmit session information (e.g., in the form of session tables) to other devices (e.g., other network visibility nodes making up the visibility fabric). FIG. 2C shows an example of a system of multiple connected network visibility nodes. In such an embodiment, the multiple distributed network visibility nodes may communicate session information with each other to maintain synchronized session tables such that a packet received at any one of the network visibility nodes is associated with the correct session.

Figure 4:
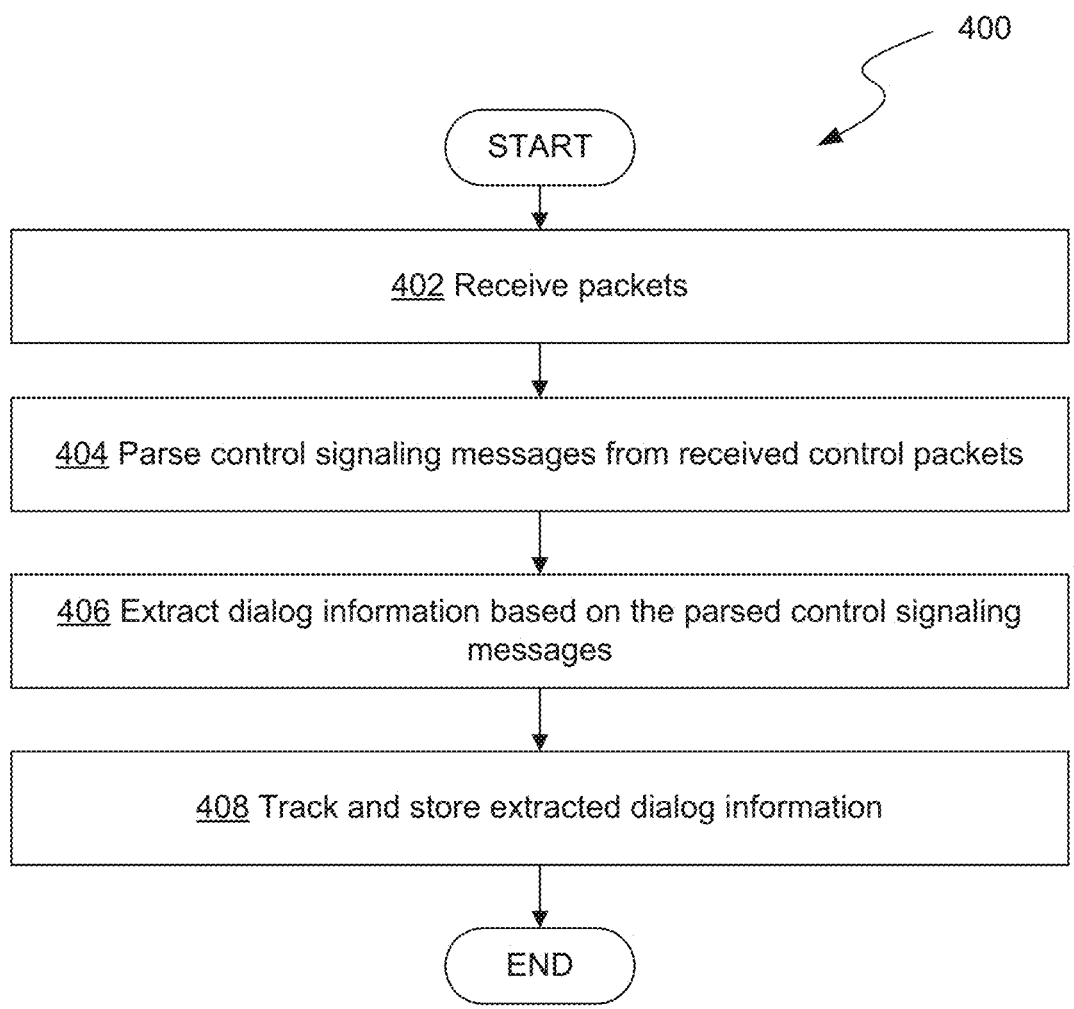
FIG. 4 shows a flow diagram of an example process for determining a parameter associated with a network flow that may be used as a sampling criterion.

FIG. 4 shows a flow diagram that describes an example process 400 for determining a parameter associated with a network flow that may be used as a sampling criterion. Example process 400 begins at step 402 with receiving packets at the network visibility node 220 (e.g., via network ports 222, 224). As previously discussed, some of the received packets may be control packets (e.g., based on SIP). At step 404, control signaling messages are parsed from the received control packets, and at step 406 certain dialog information is extracted from the parsed control signaling messages.

In the case of SIP, the control signaling messages may be part of a dialog between subscriber devices (e.g., using SDP information) to set up certain parameters of the one or more media sessions that will be part of the communications session. For example, the network visibility node 220 may track (based on the extracted dialog information) certain phases of an SIP offer/answer dialog. In a specific embodiment, the network visibility node 220 tracks signaling messages between subscriber devices for a) negotiating codec selection and 2) exchanging QoS information.

Note that term "negotiating" is used; however, an offer/answer dialog in the SIP context will typically involve a calling subscriber announcing (i.e., offering) certain parameters (e.g., codecs) that are available to be used for a corresponding media session, and a called subscriber selecting from one or more of the offered parameters. The following describes an illustrative example of an SIP dialog flow for codec and exchanging QoS requirements. A person having ordinary skill will recognize that certain details may differ depending on the protocols utilized. Further, reference to "calling subscriber" or "called subscriber" shall be understood to include any equipment or device associated with a user involved in the communications session.

The example SIP dialog flow beings with a calling subscriber device sending an initial INVITE message with a listing (e.g., in SDP) of one or more available codecs (e.g., voice codecs, video codecs, etc.). The INVITE message may also indicate that the subscriber device will need to allocate certain resources to meet a QoS requirement. Where SDP is used, the "m=" line specifies a caller port, a transport type (e.g., RTP/AVP), a list of numerical identifiers associated with the available codecs. The "a=rtpmap" lines map the numerical identifiers to particular codecs (e.g., 96=H.263, 97=AMR, etc.). The "a=curr" lines may specify whether QoS requirements for the local (calling subscriber) and remote ends (called subscriber) are currently met. For example, this line may specify that the calling subscriber needs to allocate resources in send and receive directions to meet certain QoS requirements and/or whether the calling subscriber has specific QoS requirements that the called subscriber needs to meet.

Upon receiving this INVITE message, the called (i.e., remote) subscriber inspects the SDP listing of available codecs, removes any codecs not supported by the called subscriber, and returns a listing of codecs common to both the calling and called subscriber, for example, via a 183 SESSION PROGRESS signaling message.

Upon receiving the listing of common codecs from the called subscriber, the calling subscriber examines the listing, selects one or more of the codecs to activate and sends an indication of the active one or more codecs back to the called subscriber, for example, via a provisional acknowledgment (PRACK) signaling message.

Now that the codecs that will be used as part of the one or more media sessions have been selected, a series of signaling messages may be exchanged between the calling subscriber and the called subscriber regarding status resource allocation to meet QoS requirements. For example, the calling subscriber may notify the called subscriber, for example, via an UPDATE signaling message, that resources have been allocated at the local end to meet the QoS requirements. Similarly, the called subscriber may notify the calling subscriber that the QoS requirement on the called end has also been met. Other control signaling messages may also be exchanged between the called subscriber and the calling subscriber to track events related to QoS requirements. For example, signaling messages may be exchanged indicative of current status (i.e., resource readiness) and a desired status (i.e., resource requirement) whether the QoS precondition is met or not.

Returning to FIG. 4, any of the above described dialog information extracted from signaling messages in received control packets may be tracked and stored (e.g., in a non-transitory medium associated with the network visibility node 220) at step 408. Specifically, in some embodiments, the dialog information associated with an SDP flow for codec selecting and exchange of QoS information is stored in a table wherein each control session is associated with a correlation identifier. The correlation identifier may be a single identifier (e.g., Call-ID) pulled from the tracked dialog exchange, a combination of identifiers (e.g., a tuple), or hash value based on any of the information included in the signaling messages of the tracked dialog exchange. For example, the correlation identifier may be based on a "to" tag, "from" tag, Call-ID, etc., included in the SIP headers of control packets including the signaling messages. This correlation identifier can be utilized to correlate received control session packets (e.g., SIP packets) and/or media session packets (e.g., RTP packets) to a given network flow.

Figure 5:
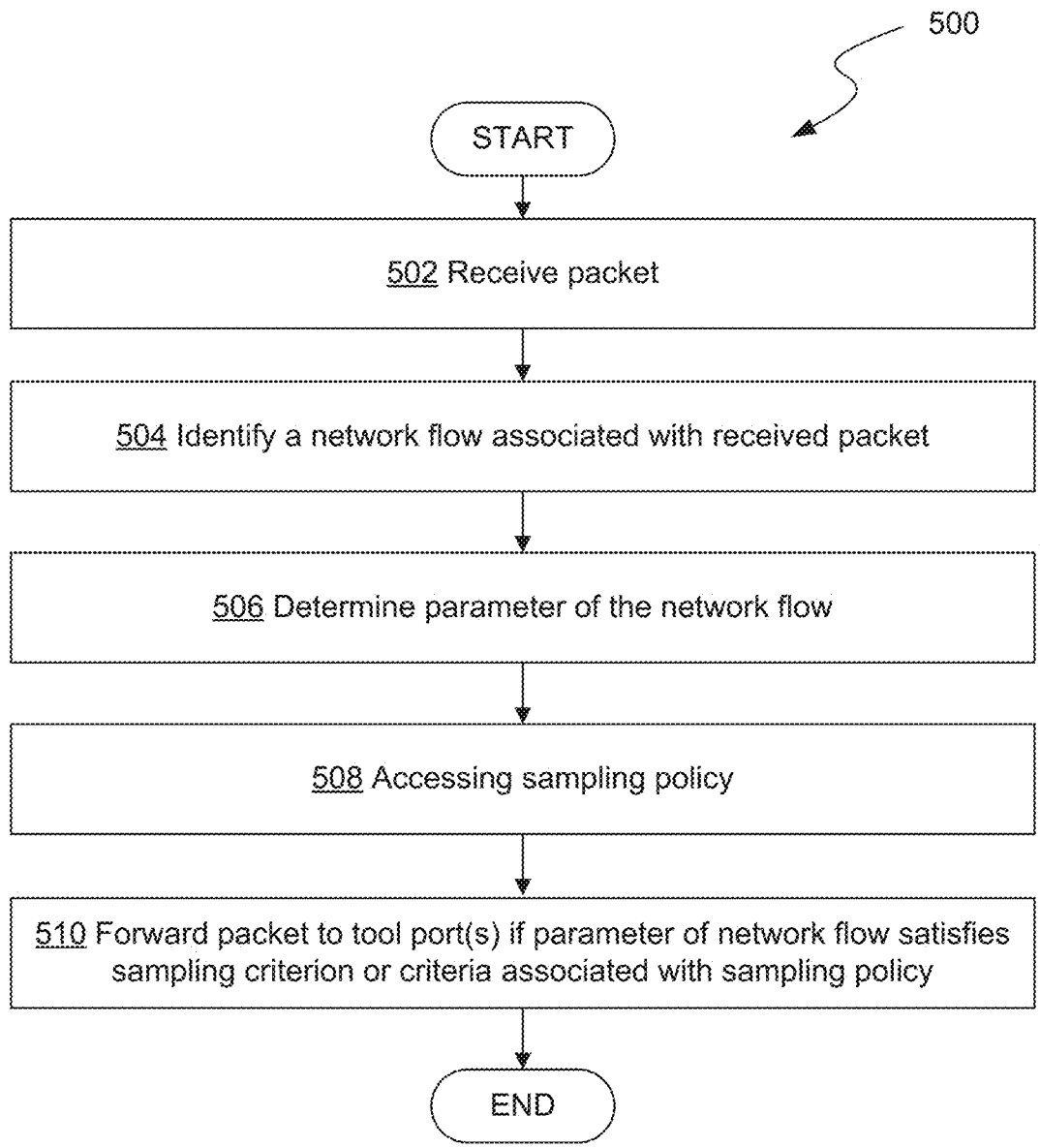
FIG. 5 shows a flow diagram that describes an example process for sampling packets associated with a certain network flow according to a policy-based sampling criterion.

FIG. 5 shows a flow diagram that describes an example process 500 for sampling packets associated with a certain network flow according to a policy-based sampling criterion. Example process 500 begins at step 502 with receiving a packet at the network visibility node 220 (e.g., via network ports 222, 224). As previously discussed, received packets may be control packets or media packets.

Example process 500 continues at step 504 with identifying a network flow that the received packet is associated with. For example, as previously discussed, if the received packet is a control packet (e.g., an SIP packet), step 504 may involve identifying a control session that the received packet belongs to, for example, based on attributes in the received packet (e.g., Call-ID, from tag, to tag headers and box-id, card-id, etc.) and comparing to the values in a control session hash table stored at the network visibility node 220. This of course assumes that the control session has already been identified and logged in the control session hash table at the network visibility node 220 based on previously received control packets. If the control session has not been logged, step 504 may involve creating a new control session entry in the control session hash table based on the received control packet. Similarly, if the received packet is a media packet (e.g., an RTP packet), step 504 may involve identifying a media session that the received packet belongs to, for example, based on attributes in the received packet (e.g., SSRC, Source IP address and port, Destination IP address and port, box id, card-id, etc.) and comparing to the values in a media session hash table stored at the network visibility node 220. This of course assumes that the media session has already been identified and logged in the media session hash table at the network visibility node 220 based on previously received control packets. If the media session has not been logged, step 504 may involve creating a new media session entry in the media session hash table based on the received media packet. The network flow that includes the identified media session or control session is then identified based on a correlation between the control sessions and media sessions. For example, as previously discussed, certain parameters of a control session (e.g., based on attributes in received control packets) can be used to correlate to corresponding media sessions. For example, step 504 may involve correlating a subscriber identifier such as an SIP URI that has been extracted from received control packets to corresponding RTP identifiers (e.g., a source IP address, destination IP address, port number, etc.) based on processing control session traffic when a subscriber device first registers before initiating a session.

Example process continues at step 506 with determining a parameter of the network flow. As previously discussed, a parameter of a given network flow may be based on information gathered by analyzing received control session packets. For example, FIG. 4 describes a process for determining information regarding selected codecs and QoS requirements for a communications session (i.e., network flow) based on an analysis of one or more control signaling messages in a dialog between subscriber devices when initiating the communications session.

Example process continues at step 508 with accessing a sampling policy to make a decision on whether to forward the received packet to an external tool for processing based on the network flow that the packet belongs to. In some embodiments, the sampling policy is accessed, at step 508, from a non-transitory medium associated with the network visibility node 220. The sampling policy may be configured by a user of the visibility node 220 to cause the sampling of network flows that have parameters that satisfy one or more sampling criteria.

For example, in some embodiments, a sampling criterion is set to sample a network flow based on the one or more codecs selected for the transfer of media streams associated with the network flow. In addition to sampling based on a selected codec, the sampling criterion may be based on other factors related to the dialog exchange when selecting the codec. For example, a sampling criterion may be based on whether both subscribers offered at least one codec, whether at least one codec offered by one subscriber matched a codec offered by another subscriber, or whether the selected codec is on a list of approved codecs. In some embodiments, the sampling policy may be configured to require that all three conditions be met to sample a given network flow. For example, in an embodiment, sampling policy may be configured to 1) verify, based on the tracked dialog information, that each subscriber offered at least one codec, 2) verify, based on the tracked dialog information, that the codecs offered by the two subscribers are on an approved list of codecs, and 3) verify, based on the tracked dialog information, that at least one codec offered by each subscriber matches a code offered by the other subscriber. In such an embodiment, the parameter of the network flow will be determined not to satisfy the sampling criterion of the policy if any of these three conditions are not met. In some embodiments, a sampling criterion is set to sample a network flow based on a QoS requirement for the media streams associated with the network flow. In some embodiments, a sampling criterion may be based on a combination of selected codecs and QoS requirements. In some embodiments, a sampling criterion may be based on a tracked QoS status (e.g., based on the tracked dialog information) such as current status and/or desired status for a QoS precondition.

The sampling criteria can also be based on other parameters that are not necessarily related to codec selection of QoS. For example, in some embodiments, a sampling criterion may be configured to sample or filter out network flows associated with subscribers or SIP agents using certain hardware. In some embodiments, a sampling criterion can be configured to sample or filter out network flows exhibiting a certain status code such as 415 for "unsupported media type."

The sampling criteria can also be based on other factors unrelated to the specific parameters of a given network flow. For example, in some embodiments, a sampling criterion can sample a pre-defined number or percentage of SIP sessions. For example, the sampling criteria may be configured to perform flow-based sampling for different percentages or quantities of network flows based on any of the above mentioned information. For example, when performing flow-based sampling based on codec information, the network visibility node 220 may be configured to sample 20% of the network flows associated with a first codec (e.g., H.263) and to sample 100% of network flows associated with a second codec (e.g., ARM). Similarly, when performing flow-based sampling based on codec information, the network visibility node 220 may be configured to sample up to 100 network flows associated with a first codec (e.g., H.263) and to sample up to 200 network flows associated with a second codec (e.g., ARM).

In some embodiments, the network visibility node 220 may be configured to change a sampled network flow at some pre-defined frequency (e.g., change sampled users once every day, every N number of hours, etc.). In such cases, the network visibility node 220 may be configured to flush a certain % of the active sample from the sample set at a certain programmable periodic interval. For example, a user may selectively configure the network visibility node 220 to flush 5% of the sample database every 8 hours, to flush 25% of the sample database every 24 hours, etc. In some embodiments, the percentage to be flushed may be selectively chosen to be anywhere from 1 to 100%, and the periodic interval may be selectively chosen to be anywhere from 1 minute to 24 hours.

If the received packet is associated with a network flow that is to be sampled (i.e., a network flow with a parameter that satisfies the policy-based sampling criterion), the packet is then forwarded at step 510 to one or more of the tool ports 282, 284 of the network visibility node 220 and on to one or more external tools 250, 252 communicatively coupled to the tool ports 282, 284 for processing. A decision on which of the one or more tool ports 282, 284 to forward the packet may be based on a user-configurable transmission scheme (described previously). For example, when forwarding a received packet to one or more tool ports 282, 284, the network visibility node 220 may access one or more mapping tables (e.g., stored in a non-transitory medium associated with the network visibility node 220) that associate certain tool ports or combinations of tool ports 282, 284 to certain network ports 222, 242 through which packets are received.

If the received packet is not associated with a network flow that is to be sampled several different actions may be taken. In an in-line configuration, a received packet that is not to be sampled may bypass any additional processing and be forwarded to an egress port (e.g., one of the network ports 222, 224) of the network visibility node 220 to be placed onto the network for transmission to its intended destination. In an out-of-band configuration where the received packet may represent a copy of the "original" packet transmitted over the network, the received packet may be simply dropped or alternatively may be forwarded to a collector port (not shown) of the network visibility node 220 for storage and potential inspection at a later time.

Alternatively, or in addition, the one or more mapping tables may associate certain tool ports or combinations of tool ports 282, 284 to certain sampling criteria of a sampling policy. Consider a scenario involving a network flow A and a network flow B, both of which are to be sampled according to an established sampling policy. Network flow A and network flow B may exhibit parameters A and B (respectively) (e.g., different QoS requirements), both of which satisfy the sampling criteria of the policy. In some embodiments, the policy may call for forwarding packets belonging to network flows having parameter A to an external tool 250 communicatively coupled to tool port 282 and forwarding packets belonging to network flows having parameter B to an external tool 252 communicatively coupled to tool port 284.

Also, in some embodiments, based on the user configuration, the network visibility node 220 can load-balance the sampled traffic across a group of external tools for processing. In such an embodiment, packets associated with a network flow to be sampled may be forwarded to different tool ports of the network visibility node 220, wherein each of the tool ports is communicatively coupled to a different one of the external tools. In some embodiments, the two or more of the multiple tool ports of a network visibility node 220 may be logically arranged as a load-balanced port group. In such an embodiment, the network visibility node 220 may be configured to forward a packet belonging to a sampled network flow to any one of the tool ports of the load-balanced tool port group. The tool port may be selected at random, based on a load calculated at the external tools, based on a load calculated at the tool ports, and/or according to a round-robin scheduling approach. In some embodiments, load balancing may be performed according to certain attributes in the received packets belonging to the sampled network flow. For example, load balancing may be performed using any of a source IP address, destination IP address, box-id, card-id, SSRC identifier, etc., as a key.

In some embodiments, the network visibility node 220 may implement an idle timeout for the sampling. For example, if the idle timeout is set to be 30 minutes, then if the network visibility node 220 determines that no packets for a certain session have been received for the last 30 minutes, the network visibility node 220 then removes the session from the active sampling database and may select a new network flow or sampling criterion for tracking and sampling.

In addition, in some embodiments, the network visibility node 220 may be configured to gather statistics for reporting to users. For example, from the sampling session, the processing unit 242 may gather information regarding a total number of bytes sampled, total number of packets sampled, packet rate, life of a sampled subscriber device (when was it included in the sampling database), errored packets, any packet drop, time when a packet related to the session was seen, timeout details, etc. The gathered statistics may be stored in a non-transitory medium in some embodiments.

In some embodiments, the network visibility node 220 may be configured to provide intelligent sampling. In some cases, to influence randomization in selecting network flows for sampling, a user may input weights for association to one or more network flows. For example, in some embodiments, the weights may be assigned to different respective network flows. The weights may provide a preference for certain flows in the selection process, and/or may make certain flows less preferable for selection. Also, in some embodiments, the selection may be performed by the network visibility node 220 based on certain monitoring parameters.

For example, in some embodiments, the network visibility node 220 may examine certain protocols, applications, patterns, or combination of the foregoing, in a traffic stream, and if such information satisfies a certain criteria, then it will trigger the network visibility node 220 to perform a selection. In other embodiments, the network visibility node 220 may perform a selection based on certain user-defined criteria for capturing "problematic" flows. For example, such criteria may include one or more of bandwidth consumption per subscriber, dropped connections, detected microbursts, delay, jitter, latency, packet loss, malformed packets, packet fragments, duplicates, etc.

Also, in some embodiments, a score representing an importance of a flow may be calculated by the network visibility node 220, and the network visibility node 220 may then use the score to select certain network flow for sampling. The network flows with the highest scores may be selected as part of the active database, while the network flows with the lowest scores may be removed from an active database (e.g., once a new network flow needs to be added to a fully populated active database). In one implementation, the network visibility node 220 may be configured to calculate such score based on a severity of an event. A severity may indicate an amount of threat an event poses. The user may define severity value for these events. For example, dropped packets may be assigned a value of 5, while packet fragments may be assigned a value of 2. Also, in some embodiments, the network visibility node 220 may calculate the score based on pre-defined weight for the network flow. In further embodiments, the network visibility node 220 may determine the score based on a frequency of an event. In still further embodiments, the network visibility node 220 may determine the score based on an inactivity timer. In some cases, a user may define a value for indicating inactivity for a certain flow.

Filtering, Whitelisting, and Load-Balancing

In some embodiments, the network visibility node 220 may be configured to maintain a stateful database for any subscribers to be filtered, whitelisted, and/or load balanced, and to extract the corresponding session information (e.g., from control signaling messages) for filtering, whitelisting, and/or load-balancing respective media traffic. For example, network flows associated with certain subscriber identifiers may be filtered so as to not to be forwarded to one or more tool ports. Conversely, network flows associated with certain subscriber identifiers may be whitelisted so as to be forwarded to one or more tool ports even if a parameter of the network flow does not satisfy a sampling criterion. The number of subscribers listed in a stateful database for filtering, whitelisting, or load-balancing may vary depending on the implementation. In an example embodiment, the database may include information regarding up to 500,000 subscribers.

In some embodiments, the network visibility node 220 may be configured to perform filtering, whitelisting, and/or load-balancing based on a subscriber identifier (e.g., an SIP URI or instance ID, if available). Such a subscriber identifier may be correlated to media identifiers (e.g., RTP identifiers such as source IP address, destination IP address, SSRC identifier, etc.) that will be used in subsequent media streams relative to the particular subscriber. Also, in some embodiments, the visibility node 220 is configured to pass all control and media traffic for a particular subscriber being sampled to the same tool port. Also, there is a possibility of having communications sessions (i.e., network flows) for the same subscriber. Thus, in some embodiments, the network visibility node 220 may be configured to perform filtering, whitelisting, and/or load-balancing to handle this scenario and to make sure that all the control and media traffic across multiple communications sessions for a particular subscriber are sent to the same tool port. In addition, in some embodiments, all communications sessions related to the same subscriber spreading across different interfaces may be identified by the network visibility node 220 and sent to the same tool port.

Also, in some embodiments, the network visibility node 220 may be configured to distribute the subscribers evenly across multiple tool ports in a load-balanced port group based on a subscriber identifier. For example, if there are 10 subscribers that are being monitored, and there are 2 tool ports assigned for these 10 subscribers, then each of the 2 tool ports may be configured to receive packets for 5 of the 10 subscribers. In such cases, all the traffic (including control and media) related to a subscriber will be sent to the same tool port. Alternatively, all SIP traffic for a particular network flow may be forwarded by the network visibility node 220 to a particular one or more tool ports while the media sessions are evenly distributed across the tool ports, making sure that all the media sessions for a subscriber are always passed to the same tool port.

In some embodiments, the network visibility node 220 may be configured to detect a hardware failure of a probe, and readjust the traffic distribution accordingly when performing load distribution. For example, in some cases, the network visibility node 220 may detect a failure in a tool port or an external tool communicatively coupled to the tool port, and may distribute the subscribers (that were bound to the failed external tool or tool port) evenly across the rest of the tool ports (or across a subset of available tool ports) in response to the detected failure, while maintaining the integrity of the individual subscriber communications sessions (i.e., making sure that all the traffic related to a subscriber is forwarded to the same tool port). Alternatively, the network visibility node 220 may be configured to detect failure at a tool port or external tool, and to failover all the subscriber sessions to the next tool port in response to the detected failure. Various techniques may be employed by the network visibility node 220 to detect failures. In some embodiments, the network visibility node 220 may be configured to monitor the physical connection to an external tool communicatively coupled to a tool port. In one implementation, the network visibility node 220 may be configured to transmit "keep-alive" messages to the external tool (e.g., ICMP request/response exchanges, or a user-customizable request/response exchanges). The network visibility node 220 is configured to keep track of responses (from the external tools) to the requests. If the network visibility node 220 fails to receive responses within a user-configurable number of retries, the network visibility node 220 may determine that a failure has occurred. In other embodiments, an external tool communicatively coupled to the network visibility node 220 via a tool port may be configured to send a keep-alive message at periodic intervals to indicate health. In such cases, a failure for the network visibility node 220 to receive these keep-alive messages within a user-specified timeout interval and/or within a number of retry attempts may be considered by the network visibility node 220 as indicative of a tool failure.

Also, in some embodiments, the network visibility node 220 may be configured to assign weights to influence distribution of packets to the tool ports. For example, in some embodiments, each tool port may have a default weight assigned to it. In other embodiments, the network visibility node 220 may receive an input from a user to configure a weight for a certain tool port. The weight assigned for the tool port may influence the distribution of subscribers to the tool port.

In some embodiments, the network visibility node 220 may be configured to load-balance packets across different tool ports. In other embodiments, the network visibility node 220 may also be configured to load-balance packets across stacking links (that is if there are multiple network visibility nodes 220 stacked together). See FIG. 2C for an example configuration involving multiple stacked network visibility nodes.

In some embodiments, the network switch device 100 may be configured to replicate control sessions (e.g., SIP sessions) across multiple tool ports of a load-balanced port group.

In some embodiments, the network visibility node 220 may start off performing the sampling in a round-robin fashion—i.e., evenly distributing received traffic evenly across a group of tool ports to ensure all the traffic associated with a particular subscriber is forwarded to the same external tool through a corresponding tool port. In some cases, the network visibility node 220 may apply weights to influence the distribution so that it may or may not be evenly distributed.

Furthermore, in some embodiments, the network visibility node 220 may be configured to maintain a count of received and/or sampled packets, and execute a re-balance based on user-defined criteria. For example, in some embodiments, a user may input a time criteria (e.g., a time of day, a date, a time interval defined by hours and/or dates, etc.) to the network visibility node 220, wherein the re-balance may be allowed to occur only during the specified time. In other embodiments, a user may enter a packet count threshold to the network visibility node 220. In such cases, the network visibility node 220 will perform the re-balance in response to a packet count above a specified threshold. In further embodiments, a user may enter a consumed bandwidth threshold to the network visibility node 220. In such cases, the network visibility node 220 will perform a re-balance in response to the consumed bandwidth (representing traffic volume) being above the specified threshold. Regardless of the technique used to trigger the re-balancing, in some embodiments, the network visibility node 220 may optionally be configured to generate a message for transmission to an external tool to notify the external tool of the re-balancing. For example, the message may be sent to a network monitoring tool through one of the tool ports, or to another device through a management port (not shown) of the network visibility node 220.

Example IP Multimedia Subsystem (IMS) Architecture

Figure 6:
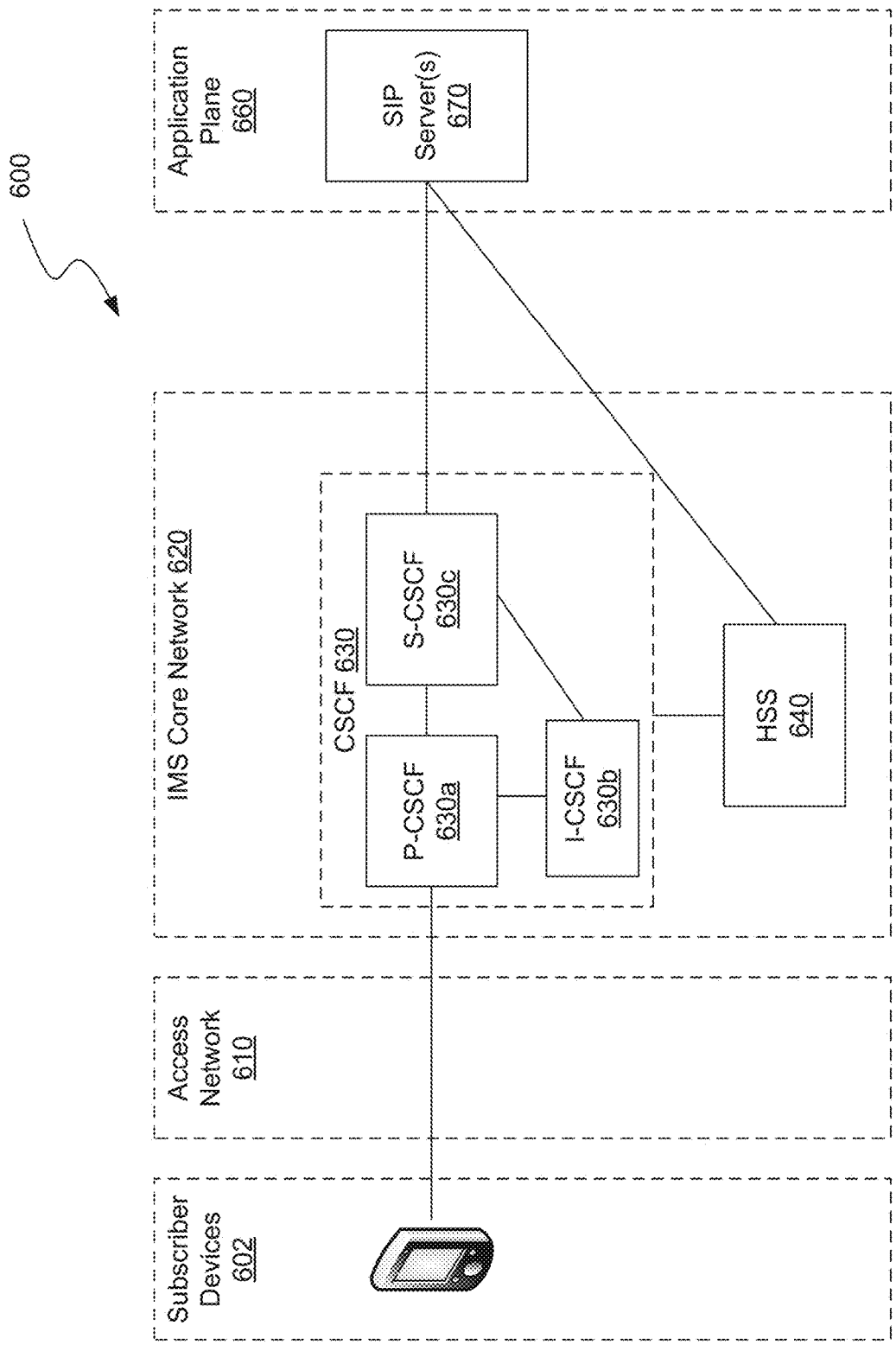
FIG. 6 shows a diagram of an example IP Multimedia Subsystem (IMS) network.

As alluded to earlier, the described technique for sampling network flows based on an analysis of signaling messages (e.g., based on SIP and SDP) in received control packets may be particularly suited for implementation in a network architecture that incorporates such protocols such as an IMS network. FIG. 6 shows a diagram of an example IMS architecture 600 in which certain described processes may be implemented. Architecture 600 is provided for illustrative clarity but is not to be construed as limiting. In practice, IMS architectures are generally more complicated than as shown in FIG. 6 and may include other components not depicted in FIG. 6. Further, the components of example IMS architecture 600 may represent different physical and/or virtual entities, may be collocated at a single device, or may be distributed over one or more networks.

As shown in FIG. 6, communication between components of the IMS core network 620 and subscriber devices 602 may be over one or more access networks 610. The access network 610 in this context generally describes any combination of networks that are associated with communication between the IMS core network 620 and the outside world (i.e., subscriber devices 602 and any other external networks). The IMS core network 620 includes several key components such as a call session control function (CSCF) server 630 and a home subscriber server (HSS) 640.

The CSCF server 630 generally controls the registration of endpoints and the routing of certain signaling messages such as SIP signaling messages. The CSCF server 630 can be broken down into several functional components such as a Proxy CSCF (P-CSCF) 630a, an Interrogating CSCF (I-CSCF) 630b, and a Serving CSCF (S-CSCF) 630c. The P-CSCF 630a represents a first point of contact into the IMS network 620 for devices. As the name implies, the P-CSCF 630a is a proxy for all signaling messages (e.g., SIP messages) from end points to the rest of the IMS network 620. In some embodiments, the P-CSCF 630a may perform encryption on certain control and/or media streams. The I-CSCF 630b generally serves as a proxy to facilitate communication between the P-CSCF 630a and the S-CSCF 630c. For example, when the I-CSCF 630b receives a signaling message, it may perform a lookup with a Home Subscriber Server (HSS) 640 to determine the S-CSCF 630c associated with the end-point terminal for the signaling messages. With this information, the I-CSCF 630b can then forward the signaling message to the appropriate S-CSCF 630c. The S-CSCF 630c is the central function in the IMS core network 620. Among its various responsibilities, the S-CSCF 630c may act as an SIP registrar, an SIP redirect server, perform subscriber authentication and registration, call routing, etc. To perform the various roles, the S-CSCF 630c may interface with the HSS 640 to retrieve subscriber/device information and interface with servers in an application plane 660 such as SIP servers 670 that provide SIP services to the subscriber devices 602.

Traffic traveling over a network such the IMS network depicted in FIG. 6 can be tapped from one or more different interface points. Certain components of the example IMS architecture 600 such as the P-CSCF 630a and S-CSCF 630c sit along the path of all control signaling traffic and therefore may present effective interface points for tapping traffic form the network. Further, packets associated with network flow can be tapped from either side of a proxy such as the P-CSCF 630a. For example, packet traffic involved in different sessions related to a network flow (e.g., a SIP control session and one or more RTP media sessions) can be tapped from different sides of the proxy and correlated according to the disclosed techniques. In some embodiments, certain components of the IMS network such as the P-CSCF 630a may be configured to modify the headers or add new headers to the signaling messages to assist in cross-correlation, particularly where traffic is tapped to multiple communicatively coupled network visibility nodes performing the policy-based sampling.

Example Deployment in a Network Environment

Figure 7:
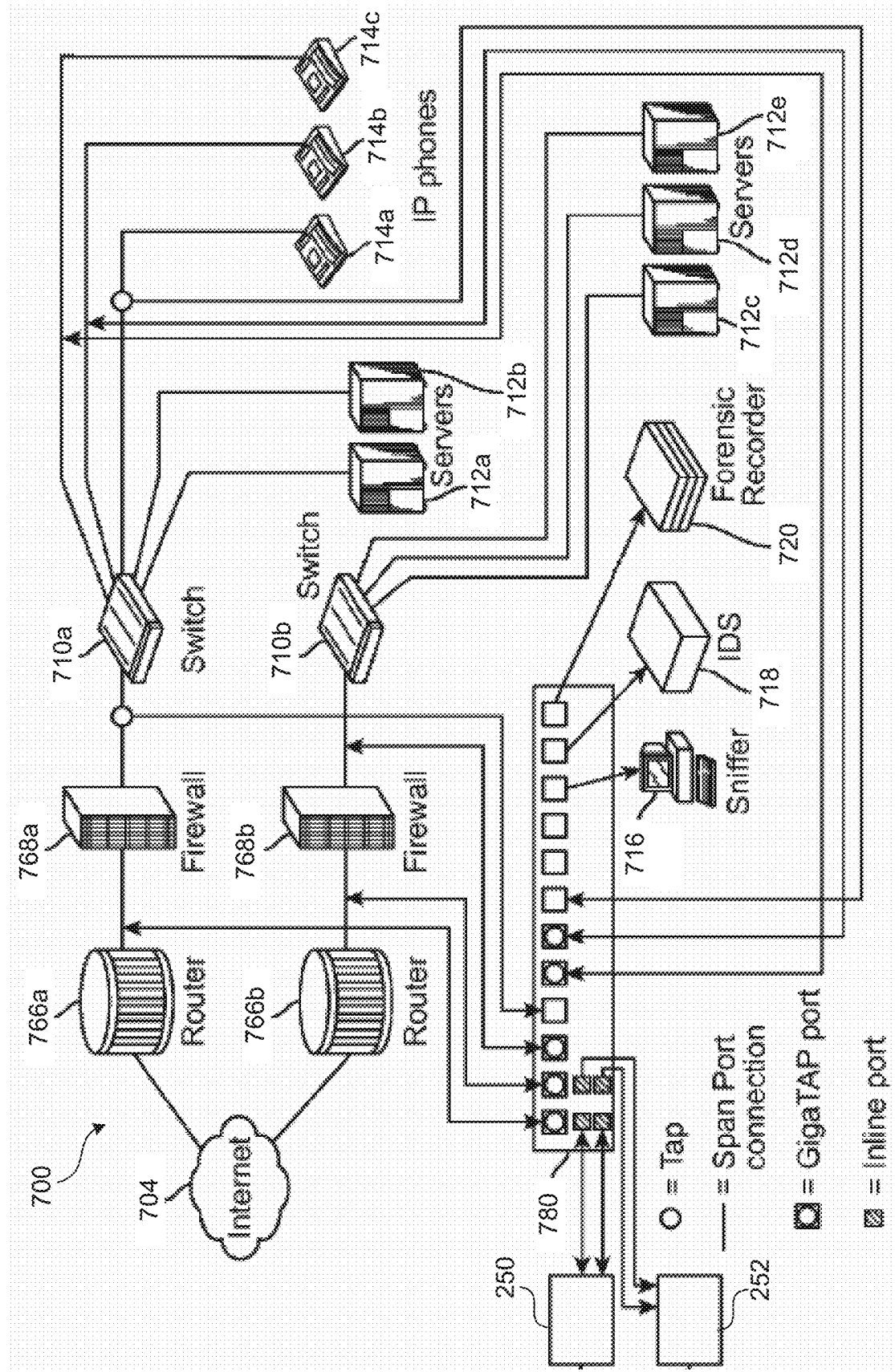
FIG. 7 shows an example deployment of a network switch appliance as a visibility node in a network environment.

FIG. 7 shows an example deployment of a network switch appliance 780 as a visibility node in a network environment 700. The network switch appliance 780 depicted in FIG. 7 may include the same or similar components as the network visibility node 220 described with respect to FIGS. 2A-2B. In the example network environment 700 depicted in FIG. 7, the Internet 704 is coupled via routers 766a-b and firewalls 768a-b to two switches 710a and 710b. Switch 710a is coupled to servers 712a-b and IP phones 714a-c. Switch 710b is coupled to servers 712c-e. A sniffer 716, an IDS 718 and a forensic recorder 720 (collectively, "non-pass through" or "out-of-band" tools) are coupled to the network switch appliance 780. As illustrated in FIG. 7, there is a reduction on the number of non-pass through tools in this deployment as compared to a conventional configuration (in which there may be one or more non-pass through tools between router 766*a* and firewall 768*a*, one or more non-pass through tools between firewall 768*a* and switch 710*a*, one or more non-pass through tools between router 766*b* and firewall 768*b*, and firewall 768*b* and switch 710*b*) because the same non-pass through tools can now access information anywhere in the network environment 700 through the appliance 780. The user has flexibility to channel whatever traffic to whatever tool or groups of non-pass through tools using the any-to-any, any-to-many and many-to-one capability of the system in accordance with the different embodiments previously described. For example, all the conversations of the IP phones 714*a-c* can be easily configured to be sent to an IDS 718. It is also possible that traffic inside a particular IP phone 714*a-c* connection can be sent to a sniffer 716, and Intrusion Detection System 718 and a forensic recorder 720 simultaneously via the one-to-many function.

In some embodiments, when using the appliance 780, one or more non-pass through tools (such as IDS 718, sniffer 716, forensic recorder 720, etc.) may be connected to tool port(s), and one or more pass through tools 750, 752 (e.g., IPS) may be connected to other tool port(s) (e.g., in-line tool port(s)). Such a configuration allows non-pass through tool (s) and pass through tool(s) to simultaneously monitor the network traffic. Each non-pass through tool is in listening mode (i.e., it receives packets intended to be communicated between two nodes), and each pass through tool is in pass-thru mode (i.e., it receives packets intended to be communicated between two nodes, processes them, and then passes the packets downstream towards the intended recipient node). In some cases, by having both an IDS and an IPS connected to the appliance 780, the appliance 780 can compare whether the IDS or the IPS sees more threats, and/or can have a redundant protection such that if the IPS misses any threat, the IDS may pick it up.

Example Processing System

Figure 8:
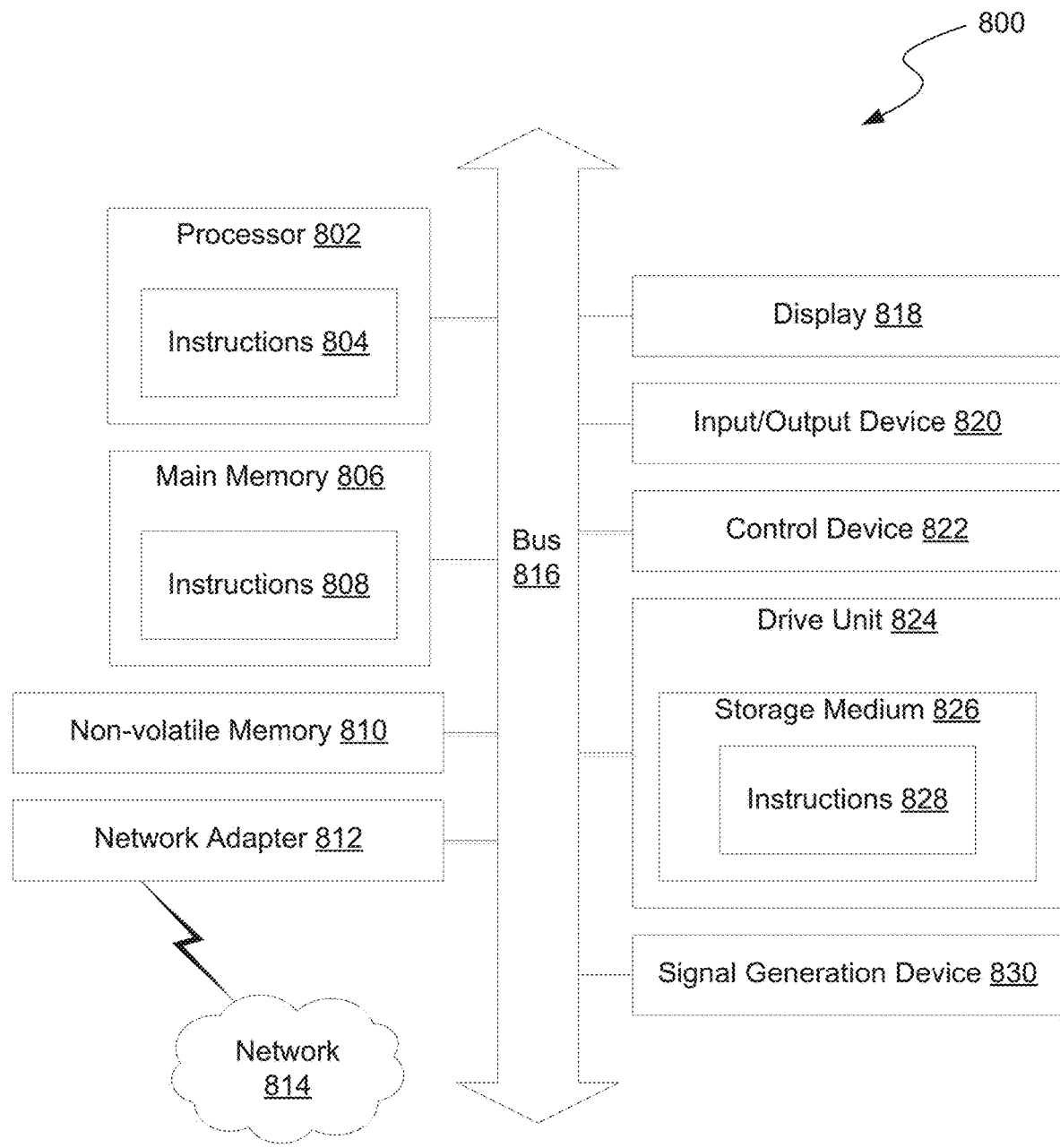
FIG. 8 shows a block diagram illustrating an example processing system.

FIG. 8 is a block diagram illustrating an example of a processing system 800 in which at least some operations described herein can be implemented. For example, at least a portion of the processing system 800 may be included in a device such as or associated with network visibility node 220. The computing system may include one or more central processing units ("processors") 802, main memory 806, non-volatile memory 810, network adapter 812 (e.g., network interfaces), display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point-to-point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as a standalone device, although the processing system 800 may be connected (e.g., wired or wirelessly) to other machines. For example, the processing system 800 may include a terminal that is coupled directly to a network appliance. As another example, the computing system 800 may be wirelessly coupled to the network appliance.

In various embodiments, the processing system 800 may be a server computer, a client computer, a personal computer (PC), a web appliance, a network router, switch or bridge, a console, or any machine capable of executing a set of instructions (sequential or otherwise) that specify actions to be taken by the computing system.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 812 enables the processing system 800 to mediate data in a network 814 with an entity that is external to the processing system 800, such as a network appliance, through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced herein are implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present innovation has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
receiving a plurality of packets at a network visibility node communicatively coupled to a network, the plurality of packets including control packets and data packets, the control packets including control signaling messages;
processing, by the network visibility node, the control packets to determine, based on the control signaling messages, a parameter of a network flow related to codec selection and associated with the plurality of packets; and
forwarding, by the network visibility node, the plurality of packets to an egress port of the network visibility node when the determined parameter of the network flow related to codec selection satisfies a sampling criterion, the egress port communicatively coupled to an external tool that is not an intended destination of the packets associated with the network flow.

2. The method of claim 1, wherein processing the control packets to determine the parameter of the network flow includes:
analyzing a dialog exchange between subscribers included in the control signaling messages;
wherein the dialog exchange is to set the parameter for a session associated with the network flow.

3. The method of claim 1, wherein the control signaling messages include Session Initiation Protocol (SIP) messages with Session Description Protocol (SDP) information indicative of the parameter of the network flow.

4. The method of claim 1, wherein the control signaling messages are part of a dialog between subscriber devices communicating over the network to set the parameter of the network flow.

5. The method of claim 1, wherein the control packets are associated with a control session, the control session controlling transfer of the data packets between the subscriber devices as part of a data session, the network flow including the control session and the data session.

6. The method of claim 5, wherein the control session is based on SIP and the data session is based on a Real-time Transport Protocol (RTP).

7. The method of claim 5, further comprising:
determining that the control session and data session are part of the same network flow by correlating information in the control packets to information in the data packets.

8. The method of claim 1, wherein processing the control packets to determine, based on the control signaling messages, the parameter of the network flow includes:
parsing the control signaling messages from the control packets; and
extracting session dialog information from the parsed control signaling messages;
wherein the determined parameter of the network flow is based on the extracted session dialog information.

9. The method of claim 8, wherein processing the control packets to determine, based on the control signaling messages, the parameter of the network flow further includes:
tracking different values for the parameter in an exchange of offer and answer messages between subscriber devices based on the extracted session dialog information; and
confirming the value for the parameter based on the tracking.

10. The method of claim 8, wherein the session dialog information is based on SDP.

11. The method of claim 1, further comprising:
processing, by the network visibility node, the control packets to determine, based on the control signaling messages, a second parameter of the network flow related to a quality of service (QoS) requirement for the network flow; and
forwarding, by the network visibility node, the plurality of packets to the egress port of the network visibility node when the second parameter of the network flow satisfies the sampling criterion.

12. The method of claim 1, further comprising:
processing a particular packet of the plurality of packets to determine that the particular packet is associated with the network flow based on a hash value computed using attributes of the particular packet, wherein the network flow is one of a plurality of identified network flows.

13. The method of claim 12, wherein processing the particular packet to determine that the particular packet is associated with the network flow includes:
determining that the particular packet is a data packet associated with a data session; and
correlating the data session to a control session associated with the network flow, wherein the control session controls the transfer of the data packets between subscriber devices as part of the data session.

14. The method of claim 1, further comprising:
generating and applying a custom header to packets associated with the network flow before forwarding to the particular tool port, the custom header indicative of the association between the packets and the network flow.

15. The method of claim 1, further comprising:
determining, by the network visibility node, that the network flow is associated with a whitelisted subscriber; and
forwarding, by the network visibility node, packets associated with the network flow to the egress port even if the determined parameter of the network flow does not satisfy the sampling criterion.

16. The method of claim 1, wherein the network includes an IP Multimedia Subsystem (IMS) network.

17. An apparatus comprising:
a plurality of network ports through which to communicate on a network;
a plurality of tool ports through which to communicate with external tools; and
a processing unit communicatively coupled to the plurality of network ports and the plurality of tool ports, the processing unit configured to:
receive a plurality of packets via one or more of the plurality of network ports, the plurality of packets including control packets and data packets, the control packets including control signaling messages between subscriber devices communicating over the network;
process the control packets to determine, based on the control signaling messages, a parameter of a network flow related to codec selection and associated with the plurality of packets; and
forward the plurality of packets to one or more of the plurality of tool ports when the determined parameter of the network flow related to codec selection satisfies a sampling criterion, the one or more tool ports communicatively coupled to external tools that are not an intended destination of the plurality of packets.

18. The apparatus of claim 17, wherein the control signaling messages include Session Initiation Protocol (SIP) messages with Session Description Protocol (SDP) information indicative of the parameter of the network flow.

19. The apparatus of claim 17, wherein the control signaling messages are part of a dialog between subscriber devices communicating over the network to set the parameter of the network flow.

20. The apparatus of claim 17, wherein the control packets are associated with a control session, the control session controlling transfer of the data packets between subscriber devices as part of a data session, the network flow including the control session and the data session.

21. The apparatus of claim 20, wherein the control session is based on SIP and the data session is based on a Real-time Transport Protocol (RTP).

22. The apparatus of claim 17, wherein processing unit is configured to process the control packets to determine the parameter of the network flow by:
parsing the control signaling messages from the control packets; and
extracting session dialog information from the parsed control signaling messages;
wherein the determined parameter of the network flow is based on the extracted session dialog information.

23. The apparatus of claim 22, wherein processing unit is configured to process the control plane packets to determine the parameter of the network flow by further:
tracking values for the parameter in an exchange of offer and answer messages between subscriber devices based on the extracted session dialog information; and
identifying a confirmed value for the parameter based on the tracking.

24. The apparatus of claim 22, wherein the session dialog information is based on SDP.

25. The apparatus of claim 17, wherein the processing unit further is configured to:
process the control packets to determine, based on the control signaling messages, a second parameter of the network flow related to a quality of service (QoS) requirement for the network flow; and
forward the plurality of packets to said one or more of the plurality of tool ports when the second parameter of the network flow satisfies the sampling criterion.

26. The apparatus of claim 17, wherein the network includes an IP Multimedia Subsystem (IMS) network.

27. An apparatus comprising:
a network port through which to communicate on a network;
a tool port through which to communicate with an external tool; and
a processing unit communicatively coupled to the network port and the tool port, the processing unit configured to:
track session dialog information including a parameter related to codec selection included in an exchange of control signaling messages between subscriber devices over the network;
select a network flow associated with the exchange of control signaling messages for sampling based on the tracked session dialog information;
including the parameter related to codec selection;
receive a packet via the network port;
determine whether the packet is associated with the network flow selected for sampling; and
forward the packet to the tool port if the packet is associated with the network flow, wherein the external tool is not an intended destination of the packet.

28. The apparatus of claim 27, wherein the processing unit further is configured to:
track session dialog information including a second parameter related to a quality of service (QoS) requirement; and
select the network flow associated with the exchange of control signaling messages for sampling further based on the second parameter related to the QoS requirement.

29. The apparatus of claim 27, wherein the control signaling messages are based on SIP and the session dialog information included in the control signaling messages is based on SDP.

30. The apparatus of claim 27, wherein the network includes an IP Multimedia Subsystem (IMS) network.

* * * * *